United States Patent [19]

Astrin

[11] Patent Number: 6,026,082

[45] Date of Patent: Feb. 15, 2000

[54] WIRELESS COMMUNICATION SYSTEM

[75] Inventor: Arthur W. Astrin, Palo Alto, Calif.

[73] Assignee: Telergy, Inc., Atherton, Calif.

[21] Appl. No.: 08/758,597

[22] Filed: Nov. 27, 1996

[51] Int. Cl.$^7$ ........................................................ H04J 3/24
[52] U.S. Cl. ............................................ 370/336; 370/347
[58] Field of Search ................................... 370/468, 433, 370/465, 329, 431; 455/452

[56] References Cited

U.S. PATENT DOCUMENTS

| | | | |
|---|---|---|---|
| 5,581,554 | 12/1996 | Van Driel et al. | 370/468 |
| 5,784,358 | 7/1998 | Smith et al. | 370/468 |
| 5,784,569 | 7/1998 | Miller et al. | 370/433 |

OTHER PUBLICATIONS

Dialogic Corporation, "Computer Telephony Architecture", Dialogic Products & Services Guide 1996, Section 4, pp. 4.2–4.16.

Rabiner, et al., "Applications of Digital Signal Processing to Speech", Theory and Application of Digital Signal Processing (1975), Chap. 12, pp. 658–708.

"American National Standard for Signal Computing System Architecture (SCSA)", VMEbus International Trade Association (Jul. 24, 1995), booklet.

"Operation within the bands 902–928 MHz, 2400–2483.5 MHz, and 5725–5850 MHZ", 47 CFR Sec. 15.247 (1990).

*Primary Examiner*—Huy D. Vu
*Attorney, Agent, or Firm*—Fliesler Dubb Meyer & Lovejoy

[57] ABSTRACT

A wireless communications system includes a base station and a plurality of terminal units which can be mobile. The base station establishes connections among sets of two or more of the mobile units so as to permit private, full-duplex conversations to take place within each set of terminal units. A number of such conversations can take place concurrently. The base station allocates packet time slots for each active terminal unit to transmit, and dynamically reduces the allocation per terminal unit only as the number of active terminal units increases. The terminal units are able to transmit the same isochronous information (such as voice) regardless of the number of packet time slots allocated to the terminal unit, by compressing the data by a greater amount when fewer packet slots are allocated, and by a lesser amount when a greater number of packet slots are allocated per unit of time. The system is able to support a range of numbers of concurrent conversations, while dynamically maximizing the quality of such communications at different times.

38 Claims, 15 Drawing Sheets

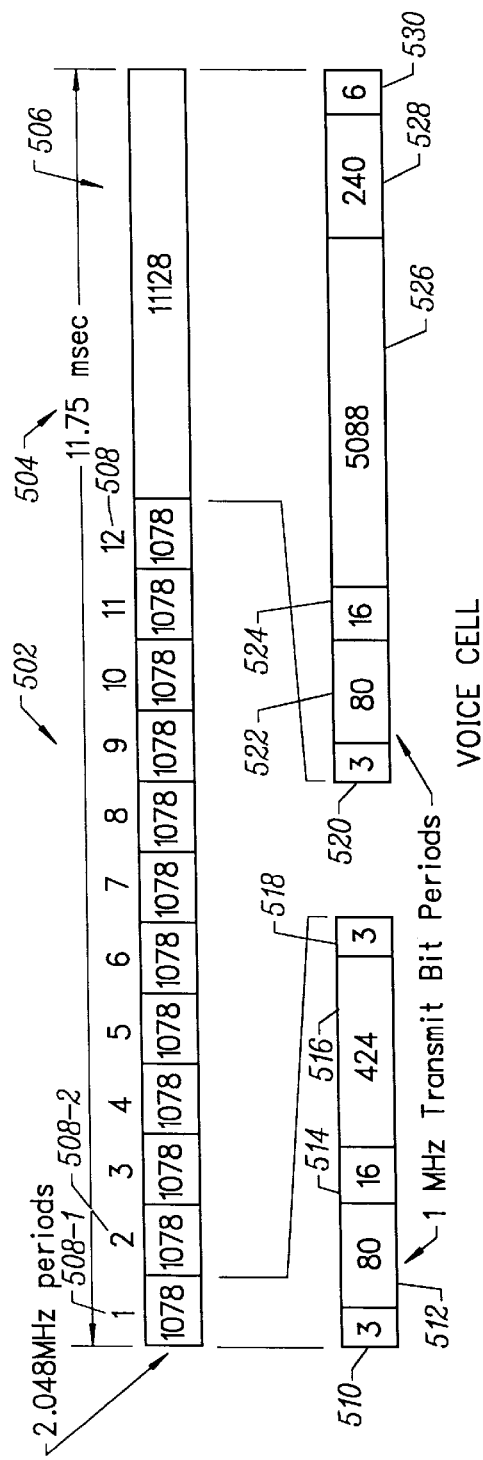

902

| Byte | Content |
|---|---|
| 0 | GFC \| VPI |
| 1 | VPI \| VCI=0 |
| 2 | VCI=0 |
| 3 | VCI=n \| PTI(3) \|CLP |
| 4 | HEC |
| 5 | CSI\| SN(3) \| SNP |
| 6 | Request type #n |
| 7 | DTMF Signaling request |
| . | Dial digit 1 |
| . | Dial digit 2 |
|  | . |
|  | . |
| 7+k | Dial digit k |
| 8+k | "SEND" |
| . |  |
| . |  |
|  |  |
| . | CRC-32 |
| . | CRC-32 |
| 51 | CRC-32 |
| 52 | CRC-32 |

Bytes 0-5 are bracketed as 904.

*FIG. 9*

| Byte | Content |
|---|---|
| 0 | GFC \| VPI |
| 1 | VPI \| VCI=15 |
| 2 | VCI=255 |
| 3 | VCI=15 \| PTI(3) \|CLP |
| 4 | HEC |
| 5 | CSI\| SN(3) \| SNP |
| 6 | CL \| N.DIFF \| N.FOLLOW |
| 7 | Frequency Plan #1 |
| 8 | Frequency Plan #2 |
| 9 | TU Allocated Slot #R1 (or Null) |
| 10 | TU Allocated Slot #R2 (or Null) |
| . | |
| . | |
| . | |
| 25 | TU Allocated Slot #R17 (or Null) |
| 26 | CRC-32 |
| 27 | CRC-32 |
| 28 | CRC-32 |
| 29 | CRC-32 |

Bytes 9–25: SLOT ALLOCATION TABLE

*FIG. 11*

CONNECTION TABLE

| | 1402 |
|---|---|
| TU 1 | TU 96 |
| TU 2 | TU 35 |
| TU 3 | NULL |
| ⋮ | ⋮ |
| TU 35 | TU 2 |
| ⋮ | ⋮ |
| TU 44 | TU 2 |
| ⋮ | ⋮ |
| TU 96 | TU 1 |

*FIG. 14*

SLOT ALLOCATION TABLE

| PACKET | 1502 |
|---|---|
| R1 | TU 2 |
| R2 | TU 96 |
| ⋮ | ⋮ |
| R27 | NULL |
| R28 | TU 35 |
| ⋮ | ⋮ |
| R48 | TU 44 |
| ⋮ | ⋮ |
| R96 | TU 1 |

*FIG. 15*

WIRELESS COMMUNICATION SYSTEM

BACKGROUND

1. Field of the Invention

The invention involves communication systems in which a number of users share a limited-capacity communications medium, and more particularly, the invention involves techniques for optimizing the number of users who can use such a medium concurrently.

2. Description of Related Art

Many industries require effective, low-cost communications capability within a local area among many physically separated, mobile workers. Such capability is important for large construction projects, convention and conference centers, major entertainment and sporting events, fire and other emergencies, service business and sales offices, high-end retail stores, airports and process manufacturers, for example.

In many of these kinds of sites, the nature of the work is one of unpredictable and constantly changing patterns of activity. Effective on-site and off-site voice communications are particularly important to the supervisor's ability to coordinate this work and to quickly resolve frequent, unexpected problems which can have significant financial impact. In crisis management and certain tasks on construction sites, such as crane operation, high communication reliability is critical to safety.

In the particular case of construction sites, a construction superintendent or foreman makes numerous decisions each day. The limitations of job-site communications, however, result in many of these decisions being made without complete information, or being put off until more information or instructions can be obtained. Either outcome can negatively impact the construction cost and schedule. The limitations of existing on-site communication systems also often cause delays as workers track down other personnel in order to obtain information, or have to re-do work because of improper instructions, all resulting in substantial productivity loss directly related to the poor job-site communications of existing systems.

Workers on sites such as these are not currently offered a flexible, integrated, cost-effective wireless voice communication solution. Some combination of general purpose communication products, such as cellular, wireline and cordless phones, pagers and broadcast radios, are currently being used with limited effectiveness. Pagers have limited effectiveness because they allow communication of only a small amount of information at a time, thereafter requiring the worker to leave his or her position and go elsewhere (such as to a telephone) to communicate further. Wireline and cordless phones with local switching systems allow a number of private conversations to occur concurrently, but severely limit the range with which a worker can move and still continue the conversation. Cellular phones, which time—or frequency—domain multiplex a number of phones in a star-type configuration relative to a base station, allow multiple private communications with a wide range of movement, but are expensive to operate and suffer from peak use and periodic reliability limitations. No solution is available today which economically allows multiple concurrent private communications to occur among workers who need freedom of movement around a large work site.

Broadcast radio systems are often used for local on-site communications. But in many installations all radios reach all the other radios on the same frequency. Because no conversations are private, many conversations cannot use the system and must wait until two people meet face-to-face. Additionally, because a user must constantly listen for a call, the user needs to suffer the distraction of keeping the radio on at all times. Many broadcast radio installations also operate in a "single-speaker model", in which one party must stop speaking before another can begin. Substantial productivity can be lost, therefore, as users wait for air time. Multi-channel radios and directed calling features reduce this problem in existing systems somewhat, but add the complexity of requiring two users to coordinate channel changes, during which time they are out of touch with the common channel.

For voice communications, systems exist which allow a larger number of users to share the communications medium, through the use of data compression techniques. A variety of data compression techniques are available, but in general, the greater the compression, the more the original voice quality suffers. In general, systems are designed for a single compression level, as appropriate for the particular market. The compression level remains constant irrespective of available bandwidth, and irrespective of caller's priority. Thus a system designed to support many users might be designed to use very heavy compression. Voice transmission quality can suffer so drastically in such systems as to render the speaker unrecognizable.

Accordingly, there is a distinct need for an economical, local area communications system which can support a large number of private conversations concurrently, while maximizing the audio quality of such communications.

SUMMARY OF THE INVENTION

The invention recognizes that while the reduced voice quality that results from greater compression might be unacceptable in general, it often can be quite acceptable if it occurs only sometimes, such as during periods of peak usage. According to the invention, therefore, roughly described, the radios in a wireless communication system dynamically shift between different levels of data compression depending on the number of radios that are then sharing the medium.

Roughly described, a communications system includes a base station and a plurality of terminal units which can be mobile. The base station establishes connections among sets of two or more of the mobile units so as to permit private, full-duplex conversations to take place within each set of terminal units. A number of such conversations can take place concurrently. The base station allocates time slots for each active terminal unit to transmit via a common communications medium, such as a wireless communications medium, and reduces the allocation per terminal unit only as the number of active terminal units increases. The terminal units are able to transmit the same isochronous information (such as voice) regardless of the number of time slots allocated to the terminal unit, by compressing the data by a greater amount when fewer time slots are available, and by a lesser amount when a greater number of time slots are available per unit of time. The system is thus able to support a range of numbers of concurrent conversations, while dynamically maximizing the quality of such communications at different times.

BRIEF DESCRIPTION OF THE DRAWINGS

The invention will be described with respect to particular embodiments thereof, and reference will be made to the drawings in which:

FIG. 5 is a timing diagram of a sub-frame.

FIG. 6 sets forth the content of a voice cell.

FIG. 9 sets forth the content of one type of connection control cell.

FIG. 11 sets forth the content of a base unit cell.

FIGS. 14 and 15 illustrate the organization of two tables maintained in memory in the Transceiver/Switch of FIG. 2.

DETAILED DESCRIPTION

Figure 1:
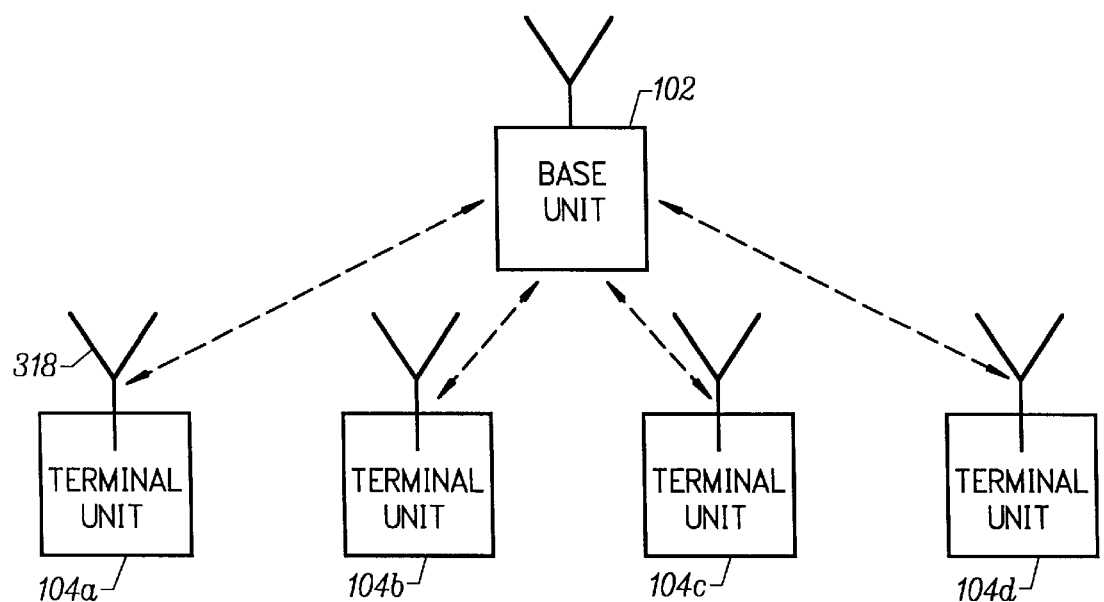
FIG. 1 is a symbolic block diagram of a system according to the invention.

FIG. 1 is a symbolic block diagram of a system according to the invention. It comprises a base unit 102, also sometimes referred to herein as a control unit. The base unit is typically (but not necessarily) stationary at the work site. The base unit 102 communicates with a number of terminal units 104a, 104b, 104c and 104d (collectively, 104), also sometimes referred to herein as mobile units. As used herein, the term "terminal units" includes both repeaters and user endpoints. The base unit 102 communicates with the terminal units 104 via a wireless communications medium shared by all of the units 102 and 104. Specifically, the communications medium is the 2.4 GHz ISM (Industrial, Scientific and Medical) radio frequency band, and the units 102 and 104 use a spread spectrum frequency hopping, time domain multiplexed technique in this band. The Federal Communications Commission has promulgated rules for the use of the 2.4 GHz ISM band, including a definition of approximately 84 1 MHz-wide frequency channels. The rules also provide that no transmitter should transmit for more than 400 milliseconds on any one frequency. This rule is intended to minimize collisions. The rules provide further that no transmitter should have a power output greater than one watt, thereby limiting the range of transmission to a few miles. The FCC's rules for the use of the 2.4 GHz frequency band are set forth in the Code of Federal Regulations (CFR), Title 47, Part 15, incorporated herein by reference. A wireless LAN standard is currently under development by the Institute of Electrical and Electronics Engineers, under the name of IEEE 802.11.

The system of FIG. 1 communicates isochronous information among the units 102 and 104. As used herein, isochronous information or data is information or data that must be delivered to a recipient observer at a fixed rate. Usually it is better to lose parts of the information or data than to deliver it at the wrong time. Examples of isochronous information include audio information such as voice, and video information. The system of FIG. 1 is optimized for communication of voice information. The recipient observer must receive such information by means of a speaker at a fixed rate, otherwise the voice will sound distorted. It will be appreciated, however, that within limitations imposed by buffering capacity, parts of the communication path from the originator to the recipient of isochronous information need not process the information or data at exactly a fixed rate. Also as used herein, "information" is abstract, such as sound, voice, words or images. "Data" is a numerical representation of such information, or a physical representation of such numbers.

Referring again to FIG. 1, the on-air protocol used by the system employs packet switching and accommodates both voice and traffic management data transmissions to maintain synchronization of the terminal units 104 and the base unit 102 and to identify and manage the content of information fields. All of the radios 102 and 104 hop through a number of frequencies in the 2.4 GHz band in a random assignment of frequencies, with each hop representing a frame in the packet protocol. Conversations are serviced in every frame of the frequency hopping protocol.

Figure 2:
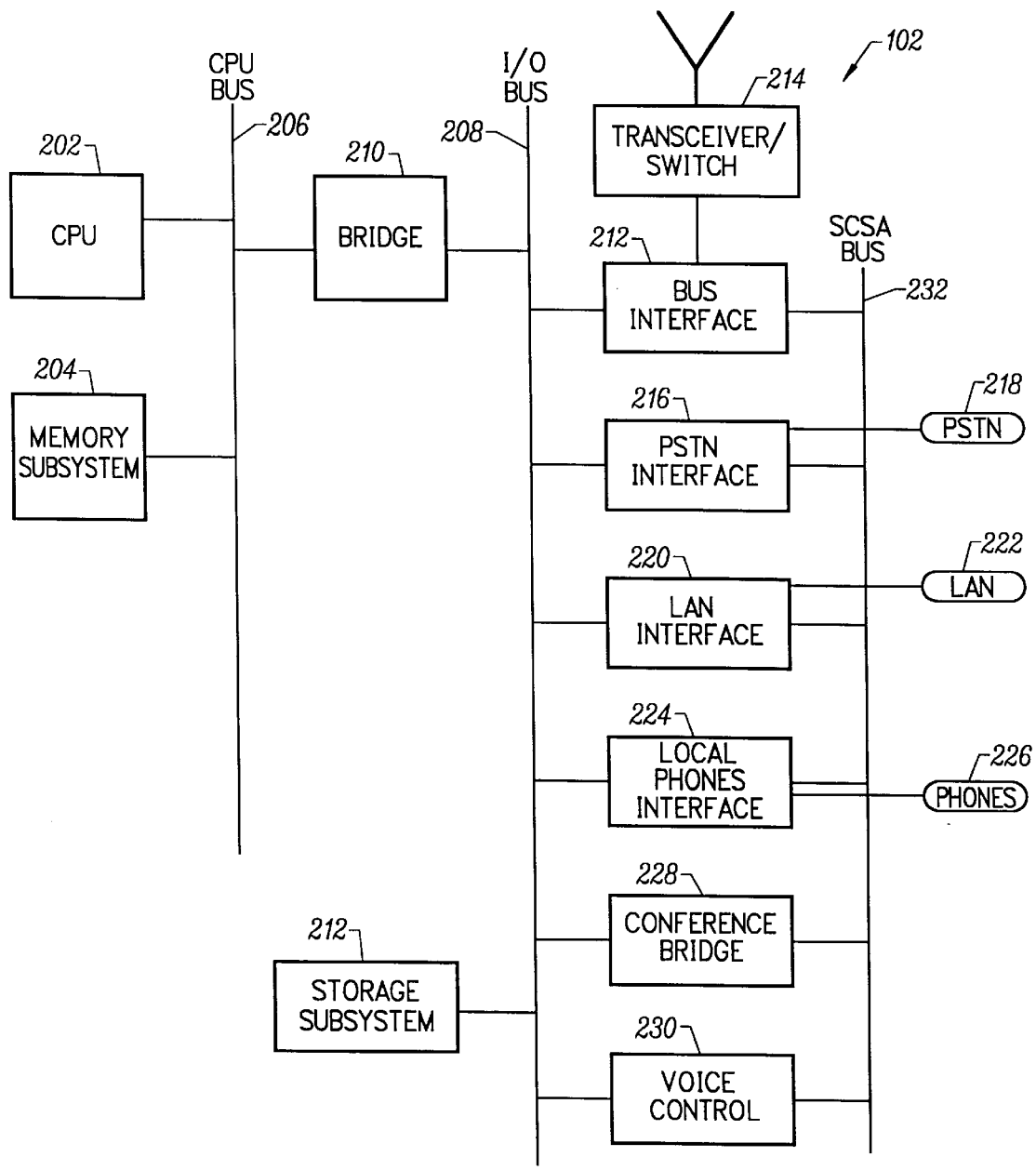
FIG. 2 is a symbolic block diagram of the base unit in the system of FIG. 1.

FIG. 2 is a symbolic block diagram of the base unit 102 (FIG. 1). It comprises a CPU 202 with a memory subsystem 204, both connected to a CPU bus 206. The CPU bus 206 is coupled to an I/O bus 208 via a bridge 210. The I/O bus 208 may be, for example, an ISA bus or a PCI bus. The I/O bus 208 is connected to a storage subsystem 212, including hard disks for example, as well as to a number of facilities which allow the otherwise conventional personal computer hardware to be used for telephony, networking and communications purposes. In particular, the I/O bus 208 is connected to a bus interface card 212, which communicates via a transceiver/switch 214 with the terminal units 104. Also connected to the I/O bus 208 is an interface 216 to the public switched telephone network (PSTN) 218, allowing conversations to take place between mobile users and anyone in the world with a telephone. The PSTN interface may be a Model DID/120 OR DPI/211, made by Dialogic, Parsippany, N.J., or an equivalent. (All Dialogic components identified herein are described in Dialogic, "Products and Services Guide (1996)", incorporated by reference herein in its entirety.) Also connected to I/O bus 208 is an interface 220 to a local area network (LAN) 222 which can be used to pass voice data among a number of base units. Also connected to I/O bus 208 is an interface 224 to local phones 226 connected by wireline to the base station 102. Local phones interface 224 may be a Dialogic model D/41E, or equivalent. A conference bridge 228, which may be a Dialogic model MSI, or equivalent, is also connected to I/O bus 208, for allowing conference calls among sets of more than two of the terminal units 104 and/or wireline-connected users.

The base unit 102 also includes a voice control facility 230 connected to the I/O bus 208. With a voice control facility, individual or conference calls can be initiated by verbal command from the users at the terminal units 104, which the speech recognition system in voice control unit 230 recognizes. Proper names and titles appropriate to all users at each site are selected and stored in the base unit 102. There is no need for users to remember or carry a list of phone numbers, or to key in manually numbers or commands for a call. Voice control allows entirely hands-free operation. A speed-dial keypad on the battery pack of each terminal unit, however, can serve as a fall-back for very noisy locations. The voice control facility may be a Dialogic model VR/160.

All of the units 212, 216, 220, 224, 228 and 230 are connected to the I/O bus 208 for control information, and are also connected together via a Signal Computing System Architecture (SCSA) bus 232. SCSA bus 232 is a time domain multiplexed bus described in VME Industry Trade Association, "Signal Computing System Architecture (SCSA)", ANSI/VITA 6-1994, incorporated herein by reference. The SCSA protocol permits a large number of available "connectors" for concurrent communication among facilities that are connected to the bus. For example, the CPU 202 can establish a "connector" between the bus interface 212 and the LAN interface 220, by programming bus interface 212 (via the I/O bus 208) with one connector number for transmit, and programming the LAN interface 220 (via the I/O bus 208) with the same connector number for receiving. Data packets retain their isochronosity when transmitted via the SCSA bus 232.

In normal operation, the transceiver/switch 214 receives data packets from each of the terminal units 104 which are active, each in respective preassigned time slots per frame, and each carrying a destination address. The receiver/switch 214 then retransmits the packets back to the terminal units 104. Each of the terminal units 104, although it receives all of the packets transmitted by the receiver/switch 214, discards all except those which are addressed to the particular terminal unit or addressed to all terminal units. In order to perform its switching function, transceiver and switch 214 maintains an internal connection table which lists at least all of the two-person conversations which are active. The CPU 202 writes to this connection table via the I/O bus 208 and bus interface 212 in order to keep it updated.

Packets received by the transceiver/switch 214 are also passed, via bus interface 212 and the SCSA bus 232, to the voice control unit 230. When voice control unit 230 identifies a voice command, it so notifies the CPU via the I/O bus 208 and the CPU responds accordingly. For example, if the voice control facility 230 recognizes a voice command to "hang up", then the CPU responds by updating the connection table in the transceiver/switch 214 to delete the connection that had included the terminal unit 104 which originated the voice command. In one embodiment, command recognition is enhanced by requiring the user to precede actual commands with some predefined, easily spoken and recognizable, attention command, that is not often used in conversation. "Alert" might be such a command.

When a group of three or more of the terminal units 104 are involved in a conference call, the base unit 102 merges the incoming data packets from all units in the group and retransmits the merged packets to all members of the group. In order to accomplish this, the transceiver/switch 214 transfers the packets from each of the conferencing terminal units 104 via the bus interface 212 and SCSA 232 to the conference bridge 228. The conference bridge 228 performs the merging function and transfers the resulting merged packets back to the transceiver/switch 214 via the SCSA 232 and bus interface 212. The transceiver/switch 214 is then able to retransmit the merged packets to each of the conferencing terminal units 104.

The operation of the PSTN interface facility 216, the LAN interface facility 220 and the local phones interface 224 with respect to SCSA bus 232 are all similar.

Figure 3:
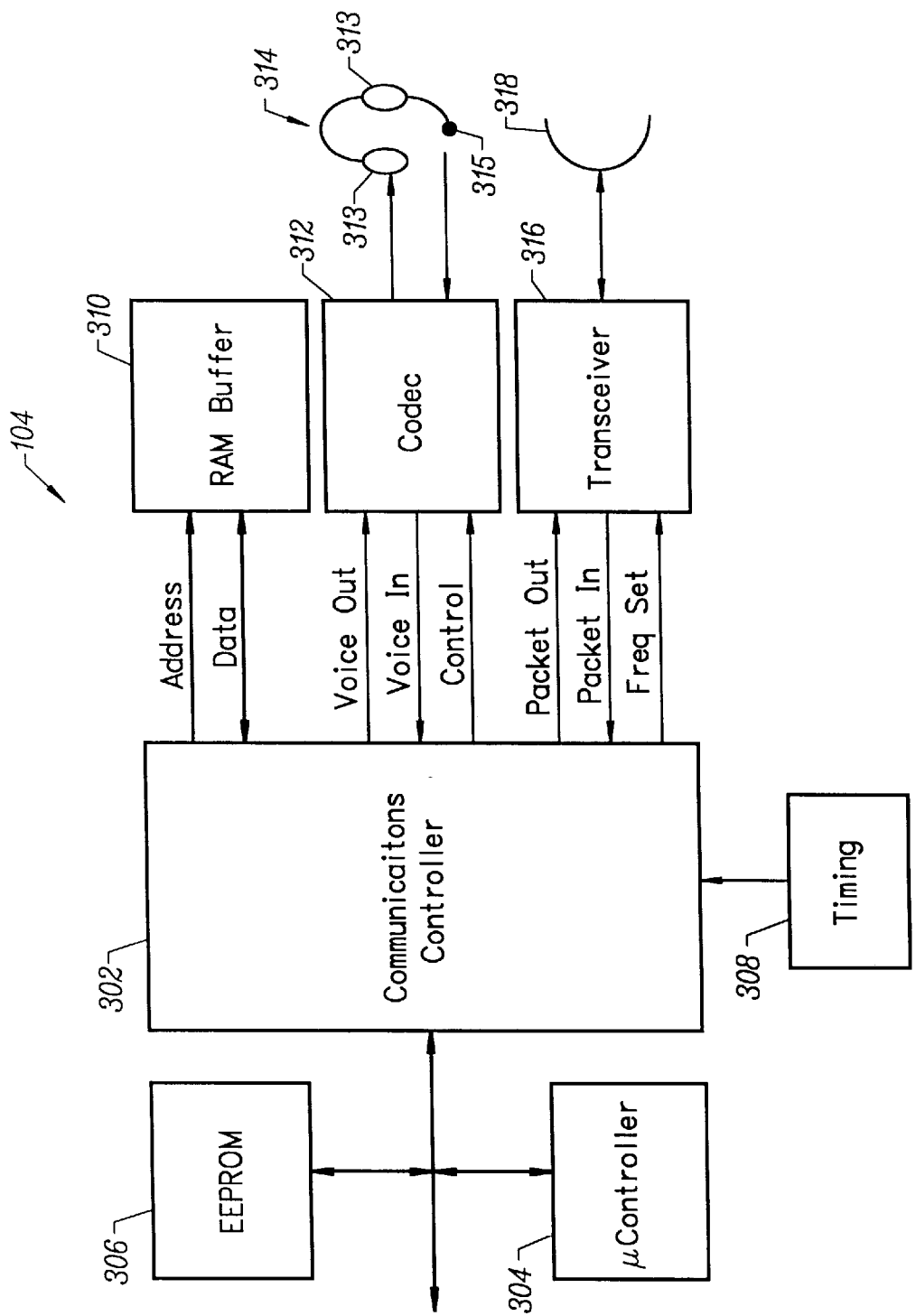
FIG. 3 is a symbolic block diagram of one of the terminal units in the system of FIG. 1.

FIG. 3 is a symbolic block diagram of the hardware components in one of the terminal units 104. It comprises a communications controller 302, which may be a field-programmable GATE array (FPGA) from Xilinx Corporation, or equivalent. The communications controller 302 performs the bulk of the ongoing control of data packet transmission and reception, and is controlled at a higher level by a microcontroller 304 and stored program EPROM 306. The communications controller 302 also communicates via address and data buses with a RAM buffer 310. The mobile unit 104 also includes a codec 312 which is connected on one side to speakers 313 and a microphone 315 (collected in FIG. 3 onto a headset 314). A user wears the headset 314, speaking into the microphone and listening to the speakers. The codec 312 encodes analog voice information received from the microphone 315 into digital voice samples, communicating them to the communications controller 302. Digital voice samples are also provided by the communications controller 302 to the codec 312, which converts them back to an analog signal for driving the speakers 313. The codec 312, which is controlled by communications controller 302, may for example be a model MC14LC5540 manufactured by Motorola, Phoenix, Ariz., or equivalent. This codec performs conventional logarithmic data compression and decompression.

The terminal unit 104 further includes a transceiver 316 which is connected on one side to the antenna 318. The transceiver transmits data packets received from the communications controller 302, and also provides the communications controller 302 with data packets received via the communications medium and the antenna 318. The transceiver 316, which may be a model PM 2500 from Pulse Engineering, San Diego, Calif. (or equivalent), has a "frequency set" input which allows the communications controller 302 to select the transmit and receive frequency which the transceiver 316 will use within the 2.4 GHz band. The system of FIG. 1 operates by hopping frequencies periodically, according to a frequency map which the communications controller 302 stores in the RAM buffer 310, and periodically the communications controller 302 asserts a new frequency to the transceiver 316 via the frequency set input.

The terminal unit 104 further includes a timing generator 308 which generates three kinds of clock signals. First, it locally generates a nominal 2.048 MHz clock signal which it divides down to produce the 8 kHz sampling clock signal for codec 312. It also counts cycles of the 2.048 MHz clock signal to delineate the sub-frames, and the time slots in each sub-frame that are allocated to the various terminal units 104 as described hereinafter. These counters are reset at the end of each full frame in response to timing signals from the base unit 102. Second, the timing generator 308 locally generates a nominal 1 MHZ clock signal which is used by the transceiver 316 as the transmit bit clock. Third, the timing generator 308 derives a nominal 1 MHZ clock signal from the signal received from the base unit 102, and this clock is used by the transceiver 316 as the receive bit clock.

In operation, voice signals from the microphone 315 are converted by the codec 312 from analog to digital form, and provided in a continuous fashion to the communications controller 302 at a rate 8,000 8-bit samples per second (that is, 64 kilobits per second). The communications controller 302 compresses this data using one of several available compression algorithms, organizes it into packets, and provides these packets to the transceiver 316 for transmission during packet time slots which have been pre-allocated to the particular terminal unit 104. As described in more detail below, these packet time slots are allocated within temporally sequential frames and sub-frames, specifically within the first of two segments in each sub-frame. During the second segment in each sub-frame, the transceiver 316 receives packets from the base unit 102 via the communications medium and antenna 318, and provides them to the communications controller 302. The communications controller 302 discards any packet not addressed to the particular terminal unit 104 and which is not a broadcast packet, assembles the packets into data sequences, decompresses the sequences in a manner which is complementary to the manner in which they were compressed, and provides them back to the codec 312 at the rate of 8,000 8-bit digital samples per second. The codec 312 converts these samples back to analog form and uses the resulting signal to drive the speakers in 313 headset 314.

As mentioned, the communications controller 302 compresses and decompresses data in accordance with one of several available data compression algorithms. As used herein, data compression algorithms may be classified as either lossless or lossy processes. Lossless processes are those in which the compressed data may be regenerated exactly as it existed prior to compression, i.e., no information is lost. Such processes are used most often for such purposes as compression of software and textual data, where the entire information content of the data must be preserved. Lossy processes are those in which a certain portion of the input information is irreversibly lost during data compression. Attempts are usually made to match lossy data compression algorithms to the particular type of information which is being compressed (such as voice or video), so that the information lost is as perceptually insignificant as possible. As used herein, two compression techniques are "different" if the resulting information after expansion of the compressed data is different in any respect at all.

Certain data compression algorithms are more lossy than others, lossless algorithms being considered herein to be the extreme of "least lossy". In general, at least for equivalent amounts of processing, data compression algorithms which produce greater compression do so at a greater loss of perceptually significant information.

Figure 4:
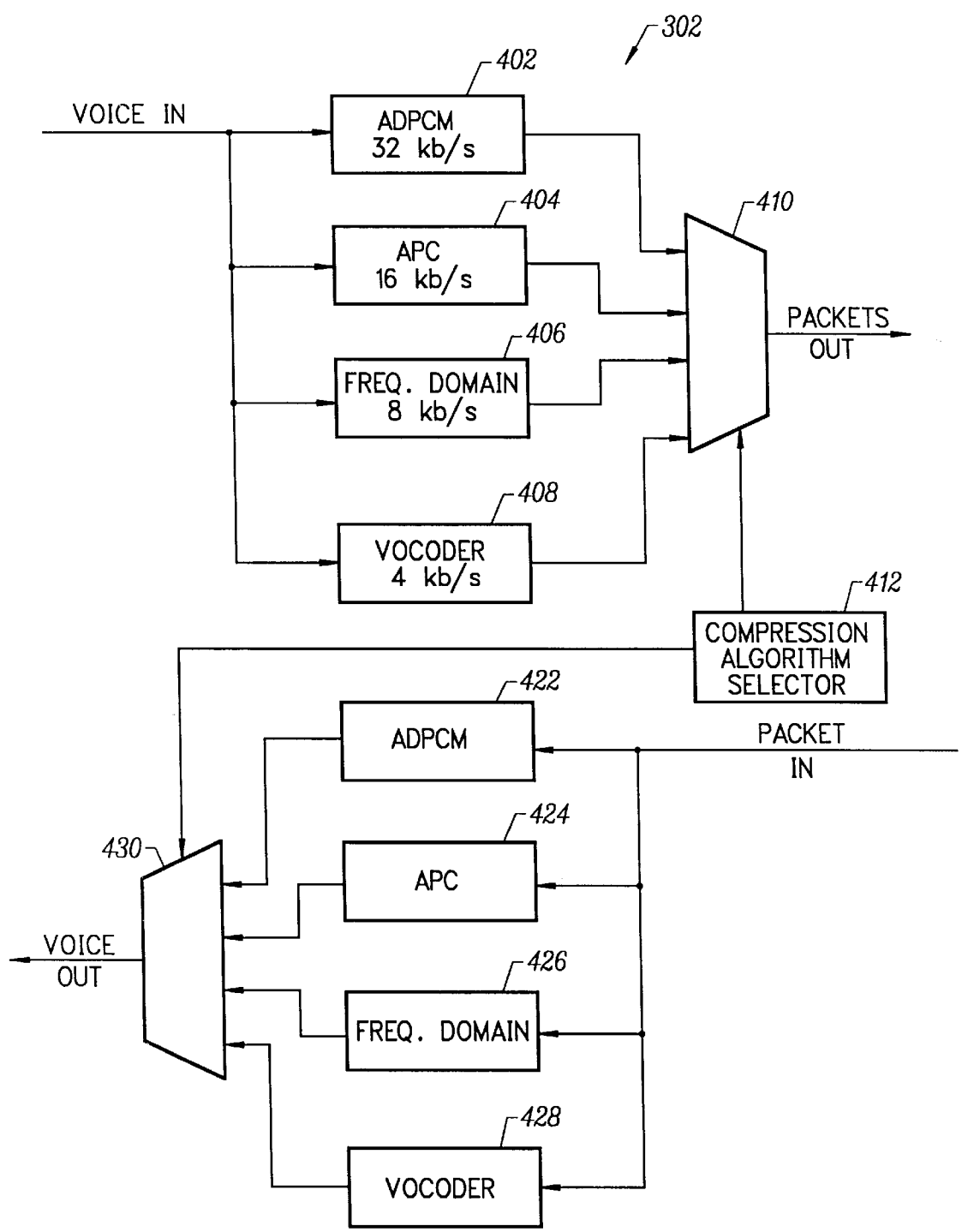
FIG. 4 is a symbolic block diagram of a portion of the communications controller in FIG. 3.

The communications controller 302 includes facilities (either hardware or software) for compressing the voice data from codec 312 according to one of four compression algorithms as shown in FIG. 4. Referring to FIG. 4, the voice input data from the codec 312 is provided to the data input port of each of four voice data compression units 402, 404, 406 and 408. Compression unit 402 performs adaptive differential pulse code modulation (ADPCM) and produces output data at a rate of 32 k bits per second. The compression unit 404 performs adaptive predictive coding (APC) and produces output data at a rate of 16 k bits per second. The data compression unit 406 performs further compression and produces output data at a rate of 8 k bits per second. The data compression unit 408 performs vocoder compression and produces output data at a rate of 4 k bits per second. These four data compression algorithms, as well as many others, individually are all conventional and are well known in the art. Various speech compression algorithms that can be used in the present invention are described in detail in Rabiner & Shafer, "Digital Processing of Speech Signals" (Prentice-Hall: 1978), incorporated herein by reference.

ADPCM is a differential coder which operates by generating error signals as the difference between the input speech samples and corresponding prediction estimates. The error signals are quantized and then output. ADPCM at 32 k bits per second achieves a Mean Opinion Score (MOS) of 4.1 or better. Mean opinion score is a method which can be used to objectively evaluate the lossiness of a particular speech compression technique, and is described in detail in Garg, "Wireless and Personal Communication Systems" (Prentice-Hall, 1995), incorporated herein by reference.

APC is also a differential coder like ADPCM, except that as whereas ADPCM employs a short-term predictor that models the speech spectral envelope, APC employs both short- and long-term prediction. APC at 16 kb/s is more lossy than ADPCM at 32 kb/s, achieving an MOS of about 3.5–4.0.

Frequency domain waveform coding algorithms decompose the input speech signal into sinusoidal components with varying amplitudes and frequencies. Thus, the speech is modeled as a time-varying line spectrum. Perceptual redundancies are removed in the frequency domain before the data is output in the form of frequency domain spectral values.

Vocoder compression algorithms attempt to describe the human speech production mechanism in terms of a few filter parameters. Vocoders consider that speech is produced with a periodic pulse train similar to the pulses generated by the vocal tract. The vocoder operates on the input signal to derive the set of filter parameters which most closely match the sound, and transmit only the filter parameters and optionally the excitation. The output of vocoder 408, after transmission and expansion by a complementary vocoder, produces limited quality speech; pure vocoder systems would likely have very limited commercial feasibility for on-site wireless operations. However, words can still be understood.

The data outputs of the four compression units 402, 404, 406 and 408 are provided to respective input ports of a multiplexer 410, the output of which carries the output packets to the transceiver 316. The selection made by the multiplexer 410 is controlled by a compression algorithm selector 412, described hereinafter.

The packets coming into the communications controller 302 from the transceiver 316 are provided to data input ports of an ADPCM decompression (expansion) facility for 22, an APC decompression facility for 424, a frequency domain decompression facility 426 and a vocoder decompression facility 428. These facilities perform data decompression in a manner that is complementary to the compression performed by compression units 402, 404, 406 and 408, respectively. The data outputs of the units 422, 424, 426 and 428 are provided to respective input ports of a 4-input multiplexer 430, the output of which carries the voice output data to the codec 312. The selection made by multiplexer 430 is controlled by the compression algorithm selector 412.

Although the four compression and four decompression units are shown as separate parallel hardware data paths in FIG. 4, it will be appreciated that some or all of these data paths can share the same hardware. Alternatively or additionally, the four data compression units and the four data decompression units can be implemented as separate software modules in a single program operating on a single processor, the selection among them being made by invoking only one of the four modules. In addition, whereas in one embodiment the four compression units and the four decompression units operate on all input samples, with the output packets or voice samples being produced merely by selection among the outputs of the compression or decompression units, in another embodiment only the compression and decompression units which are selected are operating at any one time.

It should be noted that other embodiments of the invention can use different numbers of compression algorithms to select from, and/or can use different kinds of compression algorithms. For example, one compression algorithm which could be used in place of the frequency domain compression algorithm in unit 406, and its complementary decompression algorithm 426, involves residual linear prediction (RELP) coding. RELP is a hybrid coder that uses both waveform coding techniques and vocoder techniques. The RELP compression unit employs short-term (and in certain cases, long-term) linear prediction to formulate a difference signal (residual) in a feed-forward manner. These systems utilize either pitch-aligned, high-frequency regeneration procedures or full-band pitch prediction in the time domain to remove the pitch information from the residual signal prior to band limitation and decimation in the compression unit. In the complementary decompression unit, the excitation signal is defined by an analysis by synthesis (AbS) optimization procedure. Both the compression and decompression units filter using a closed-loop optimization process that minimizes a perceptually weighted error measure formed between the voice input signal and the decompressed reconstructed voice output signal. RELP coding is described in Garg, incorporated above.

As mentioned, the system of FIG. 1 treats the communications medium as a time domain multiplexed medium. The system operates with temporally sequential frames of 94 milliseconds each, during which each active terminal unit 104 has allocated thereto at least one time slot for transmitting. Each of the frames is divided into eight sub-frames, and each sub-frame itself includes time slots which are pre-allocated for transmission by various transmitters in the system.

More precisely, the communications medium is treated as a packet time multiplexed medium. In many time domain multiplexed systems, all transmitters operate in response to a synchronized clock, and maximum transmission delays are specified such that receivers are guaranteed to receive transmitted bits within the bit times in which they are transmitted. In the system of FIG. 1, however, transmitters and receivers can have small clock frequency variations, and the distance between transmitters and receivers can vary significantly. Thus, while each transmitter is still permitted to transmit only during specific bit times, the bit time during which the transmission is received can vary somewhat. The system inserts guard bands between transmissions as hereinafter explained, in order to prevent overlap.

Accordingly, for the purposes of the present description, packet time multiplexing is defined to permit more variation in the allocated time slots than would be permitted in a clock-synchronized time domain multiplexed system. Each transmitter might transmit a data packet only during what it believes are specific predefined bit times, but the time slots allocated to each transmitter have slightly longer duration. Receivers are designed to accept packets received at any time within what the receiver believes to constitute the longer duration time period allocated for transmissions by the transmitter. A packet time domain multiplexed system is considered herein to be a special case of a time multiplexed system.

FIG. 5 illustrates the timing of each sub-frame. As mentioned, two clock periods are used: a 2.048 MHz clock is used to define frames, sub-frames and transmission cells (packet time slots), whereas a 1 MHz clock is used to define bit times for actual transmission of data during the transmission cells. As can be seen from FIG. 5, the sub-frame 502 is divided into two main segments 504 and 506. The first segment 504 is further divided into packet time slots 508-1, 508-2, . . . , 508-12 (collectively, 508), which are pre-allocated for transmissions by individual ones of the terminal units 104. Each time slot 508 has a period equal to 1,078 of the 2.048 MHz clock periods. The second primary segment 506 of the sub-frame 502 is pre-allocated for transmissions by the base unit 102. Segment 506 has a period equal to 11,128 clock periods of the 2.048 MHz clock.

Each of the terminal unit transmit time slots 508 includes 526 bit times at the 1 MHz bit rate, divided as follows: a leading guard band 510 (3 bits); a preamble 512 (80 bits); a start word 514 (16 bits); a voice sample packet 516 (424 bits); and a trailing guard band 518 (3 bits). The guard bands 510 and 518 are included to ensure that transmissions by terminal units 104 in time slots which immediately precede or follow a given time slot do not overlap despite possible clock skews and possible different distances from the base unit 102. No terminal unit 104 is permitted to transmit during what it believes is a guard band.

The 80-bit preamble is a 10101010 . . . "dotting" pattern which enables the base unit 102 to synchronize with the upcoming bit signal. The 16-bit start word, also called a framing pattern, is a distinct pattern which the base unit 102 recognizes as indicating the end of the dotting pattern and the beginning of the actual data.

The 424-bit (53-byte) data region 516 of the time slot 508 is organized in a manner which conforms to the asynchronous transmission protocol (ATM), described in DePrycker, "ATM Broadband Communication" (Prentice-Hall, 1995), incorporated herein by reference. The cell is illustrated in FIG. 6, and contains six bytes of header information followed by 47 bytes of CBR (constant bit rate) voice samples. The header information includes, among other fields not important for an understanding of the invention, an 8-bit VPI field and a 16-bit VCI field which together specify the address of base unit 102. The header also includes a 3-bit payload type indication (PTI) indicating that the payload represents voice samples, and an 8-bit header error correction (HEC) byte which provides error detection and correction capability covering the other bytes of the header. The header also includes typical GFC (generic flow control), CLP (cell loss priority) and SNP (serial number) fields. While the present embodiment uses ATM-format data packets, it will be appreciated that different embodiments could instead use different formats for the data packet 516.

Returning to FIG. 5, the second primary segment 506 of the sub-frame 502 also begins with a 3-bit guard band, an 80-bit dotting pattern and a 16-bit framing pattern, 520, 522 and 524, respectively. Thereafter follows a 5,088-bit base unit transmit period 526 during which the base unit 102 can transmit up to 12 53-byte ATM-type packets. Each of the 12 packets is generally directed to a different one of the terminal units 104, and the address of the terminal unit 104 to which a particular packet is directed is indicated in the VPI and VCI fields of the header. Each packet has same organization as shown in FIG. 6. If fewer than 12 terminal units 104 are active, then fewer than 12 base unit transmit time slots are used; the remainder are addressed to a null address. Normally the data packets retransmitted by base unit 102 in the base unit transmit time 526 are the same as (or dependent upon) those received by the base unit 102 earlier in the same sub-frame. No guard time is required between the ATM packets within base unit transmit time 526, because there is no risk of two different transmitters overlapping their transmissions in time.

Following the base unit transmit time period 526 is a 240-bit time period during which the base unit 102 transmits a 30-byte frame control (FC) packet 528, also sometimes referred to herein as a Base Unit (BU) packet 528. The base unit 102 transmits a BU packet at the end of each of the first seven sub-frames. The system hops to a new frequency within the 2.4 GHz band at the end of each frame, and the region 528 at the end of the eighth sub-frame is reserved for the time required for each of the units 102 and 104 to change frequencies. The last 6-bit region 530 in each sub-frame is reserved as another guard band.

Figure 7A:
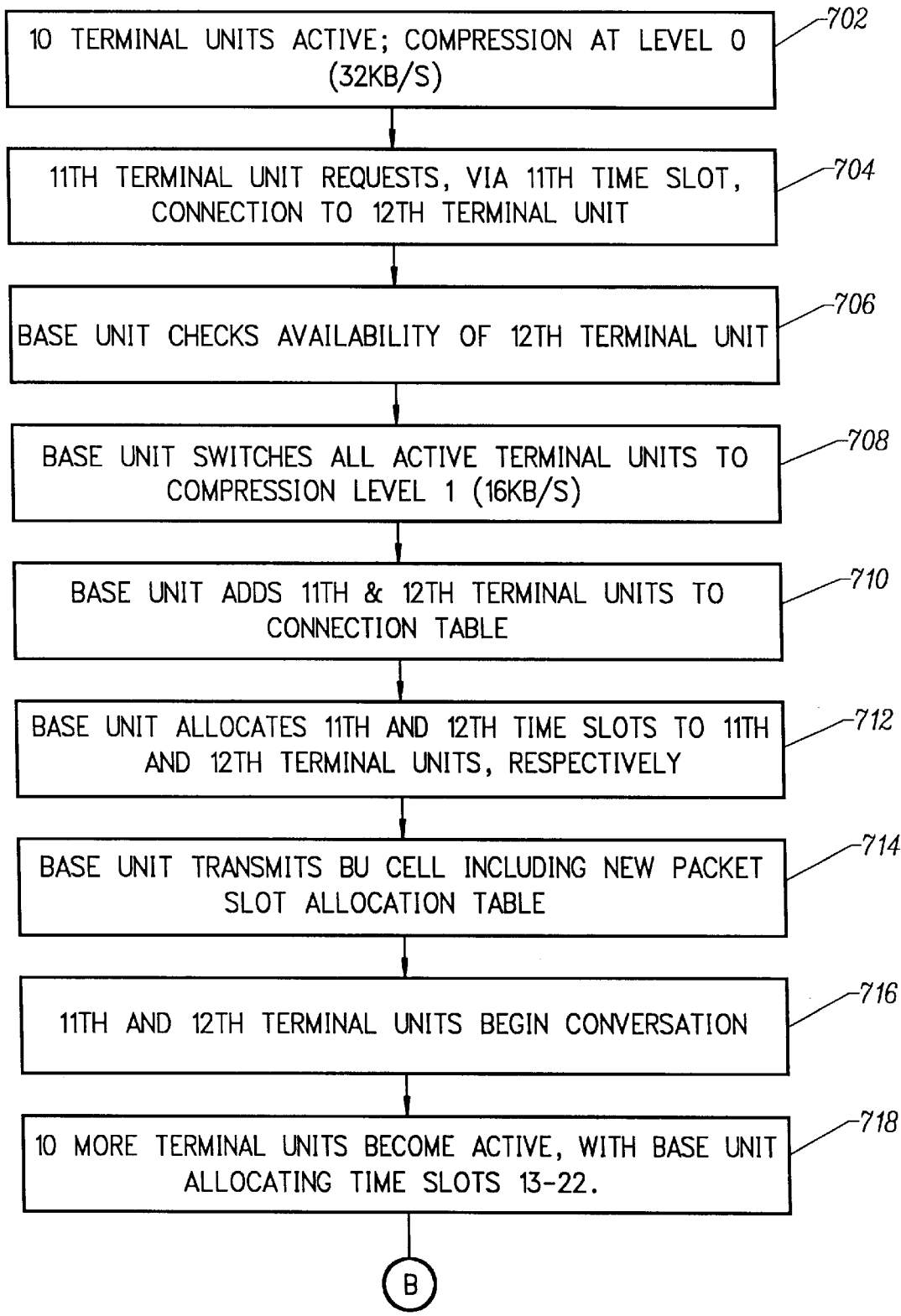
FIGS. 7A, 7B and 7C together constitute a flow chart illustrating a manner in which the system of FIG. 1 can operate.
Figure 7B:
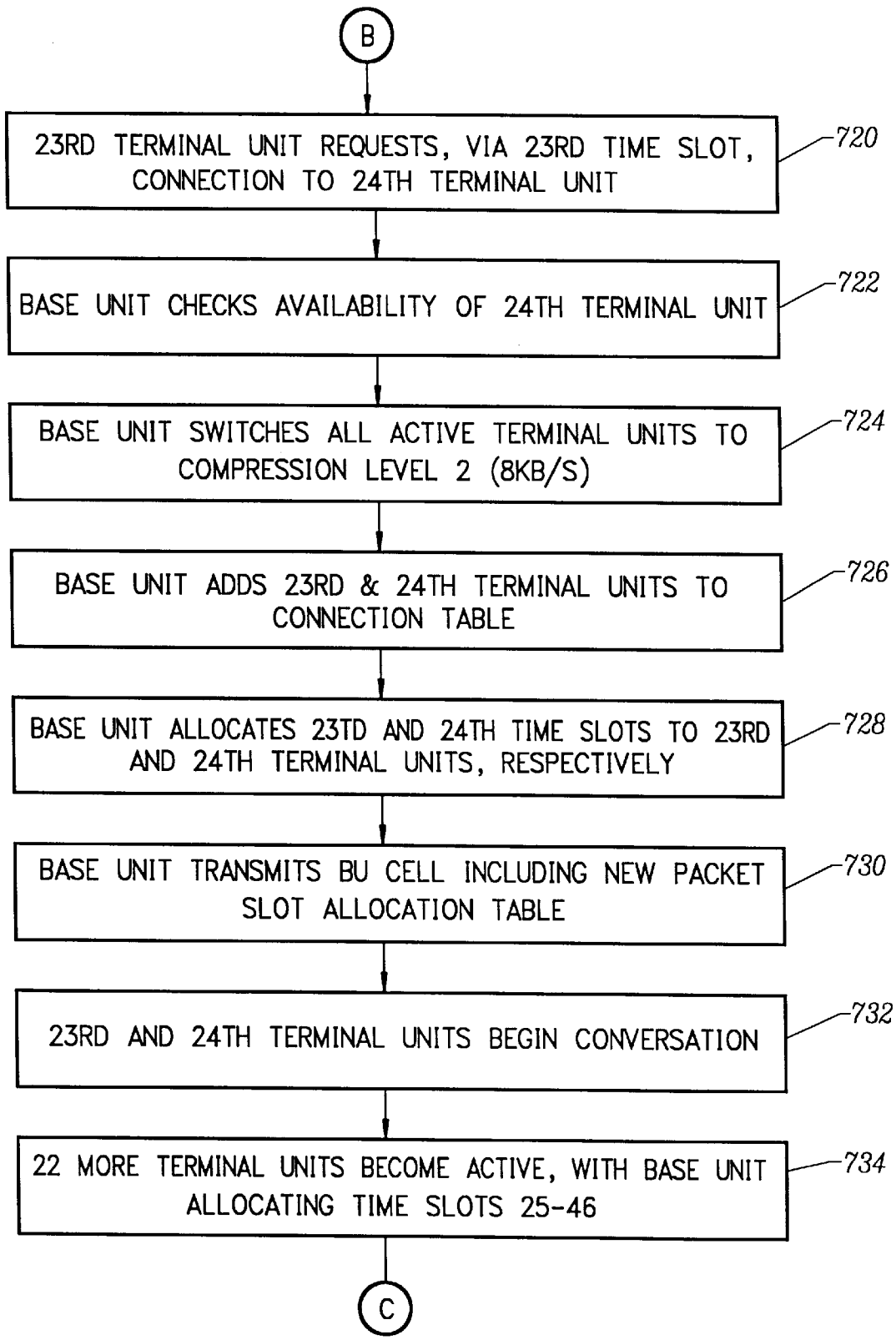
Figure 7C:
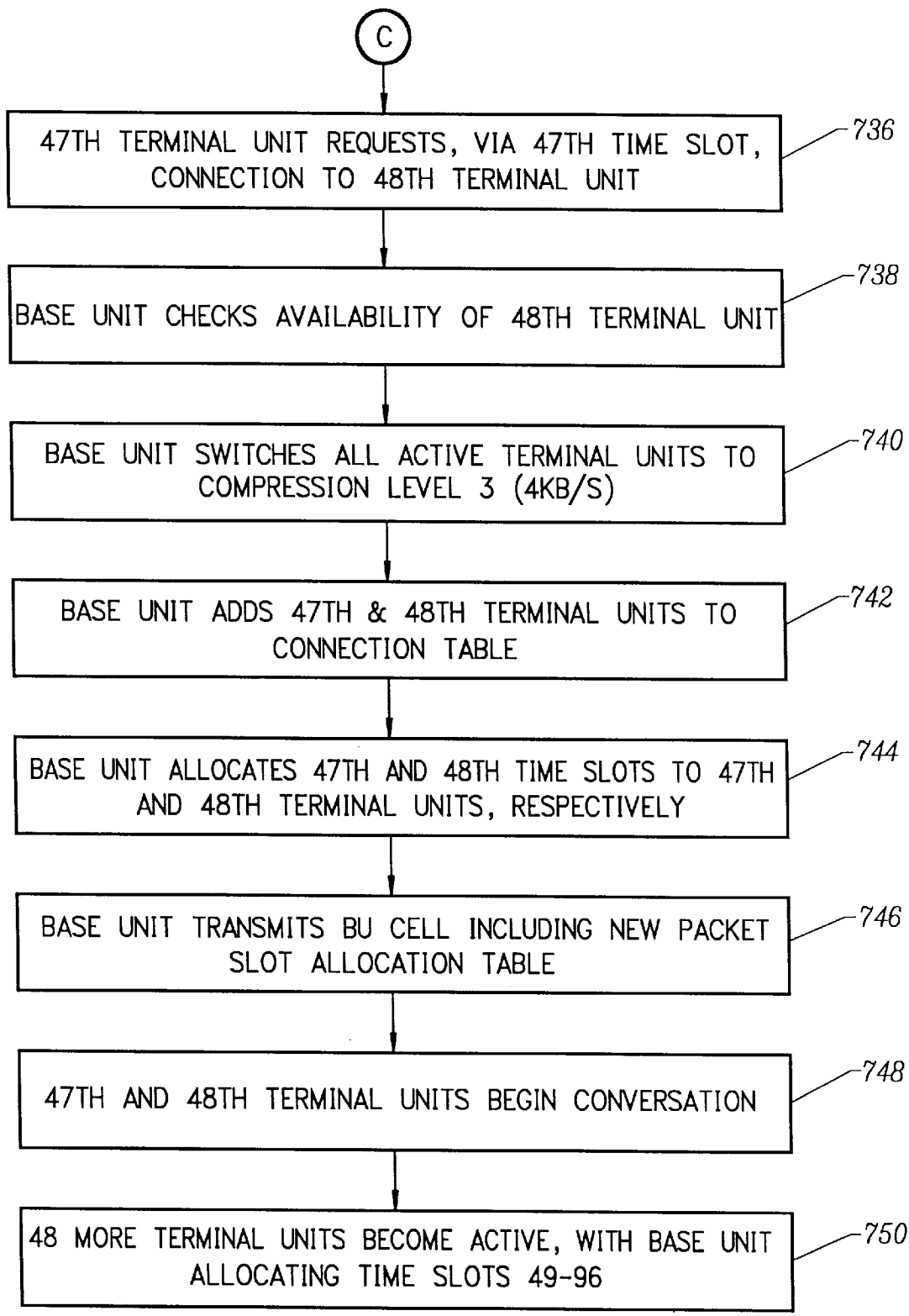

FIG. 7 is a flow chart illustrating a sequence of operations that take place when the number of active users on the system of FIG. 1 increases gradually from fewer than 12 users to more than 48. FIG. 7A continues with the letter "B" in FIG. 7B, which continues with the letter "C" in FIG. 7C.

Figure 8:
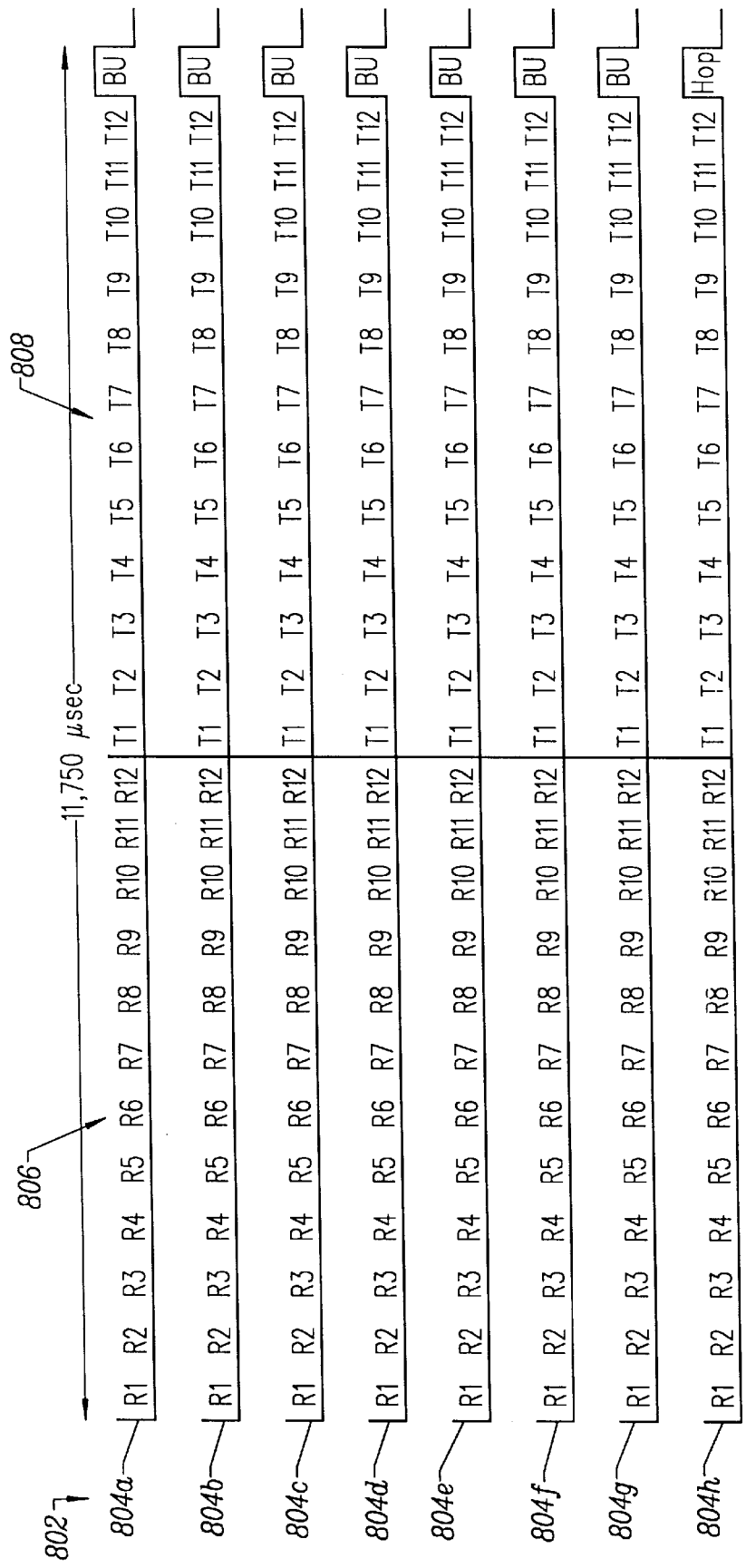
FIGS. 8, 10, 12 and 13 are timing diagrams of respective frames.

Beginning in step 702 of FIG. 7A, it is assumed that ten terminal units 104 are currently active. All ten terminal units are using compression level "0", which in the embodiment of FIG. 4 uses the ADPCM compression algorithm implemented in units 402 and 422. In this situation, the allocation of time slots is as shown in FIG. 8. In particular, FIG. 8 illustrates a single frame 802, divided into eight 11.75 millisecond sub-frames 804a–804h, collectively, 804, for a total of 94 milliseconds. As with the sub-frame 502 in FIG. 5, each of these sub-frames 804 in FIG. 8 includes a first primary segment 806 during which terminal units 104 transmit in their pre-allocated time slots, and a second primary segment 808 during which the base unit 102 transmits. As viewed by the base unit 102, the base unit 102 receives packets during the first primary segment 806 and transmits packets during the second primary segment 808. Primary segment 806 contains 12 "receive" packet time slots R1, . . . , R12, and the second segment 808 contains "transmit" time slots T1, . . . , T12.

At the time of step 702, time slots R1–R10 and T1–T10 are in use. Five two-way conversations are taking place, although at other times or in other embodiments, conference calls of three or more parties may be taking place. Each of the terminal units is allocated one transmit packet time slot in segment 806 per sub-frame 804, and since all eight sub-frames 804 are identical, each terminal unit effectively has eight packet time slots per frame 802 within which to transmit voice data. At 47 bytes of voice samples per transmit time slot, eight time slots per frame 802, and each frame completing in 94 milliseconds, the allocation of FIG. 8 allows each terminal unit 104 to transmit voice data at the compression level 0 rate of 32 kb/s. This is a very high-quality connection.

In a step 704 (FIG. 7A), an eleventh terminal unit 104 requests a connection to a twelfth terminal unit 104. In one sub-frame 804, the eleventh terminal unit listens to the traffic which the base unit 102 is transmitting during the second segment 808 of each sub-frame, in order to identify the first time slot which is unallocated (status is inactive), which in the present situation, is assumed to be time slot 11 (R11 and T11). The eleventh terminal unit therefore makes its request by transmitting a connection control cell to the base unit 102 during R11 in one of the subsequent sub-frames. If another terminal unit has also decided to transmit a connection control cell during the same time slot, the base unit 102 will receive an invalid cell and will not make any acknowledgment. The two terminal units, having not received any acknowledgment, will then each wait a random number of sub-frames and try again. This process repeats until each terminal unit receives an acknowledgment from the base unit 102.

FIG. 9 is a table illustrating the structure of a connection control cell 902. It is once again an ATM-compliant cell, beginning with a 6-byte header 904. The cell also contains a request type number which, in one embodiment, is one of the following: connect (request a connection to a designated target terminal unit); connect acknowledge (target terminal unit accepts the connection); release (end a connection with another terminal unit); and release complete (other terminal unit acknowledges the release). Other embodiments can include different or additional request types. In step 704, the-request type is "connect".

After the request type in the connection control cell 902, the eleventh terminal unit indicates in byte 7 that it is going to identify the target terminal unit by specifying the extension number of the target terminal unit. In the connection control cell 902, since the target terminal unit 104 is being identified by its numeric extension, the digits of the desired extension are specified in bytes 8 through 7+k (where k is the number of digits), and a "send" byte terminates the list of digits. The last four bytes of the cell collectively contain a 32-bit CRC code.

Returning to FIG. 7A, in step 706, the base unit 102 checks the availability of the target twelfth terminal unit 104 by examining an internal table. Assuming it is available, the base unit 102 now realizes that if it were to allocate transmission time slots to each of the two new terminal units, then all 12 packet time slots of a sub-frame 804 would be allocated and no time slot would be available for a connection control cell from the next terminal unit 104 desiring access. For this reason, the base unit 102 never allows the last available time slot to be allocated. (Note that in another embodiment, one time slot (e.g., R1) is always reserved for connection control traffic; this avoids the need for each new terminal unit to listen for an unused time slot before transmitting the connection control cell.) Accordingly, in a step 708, the base unit 102 switches all of the currently active terminal units to compression level 1, that is 16 kb/s. It announces the new compression level by revising the contents of the BU cells as hereinafter described. The terminal units 104 change to compression level 1 by using their APC compression and decompression facilities 404 and 424.

Figure 10:
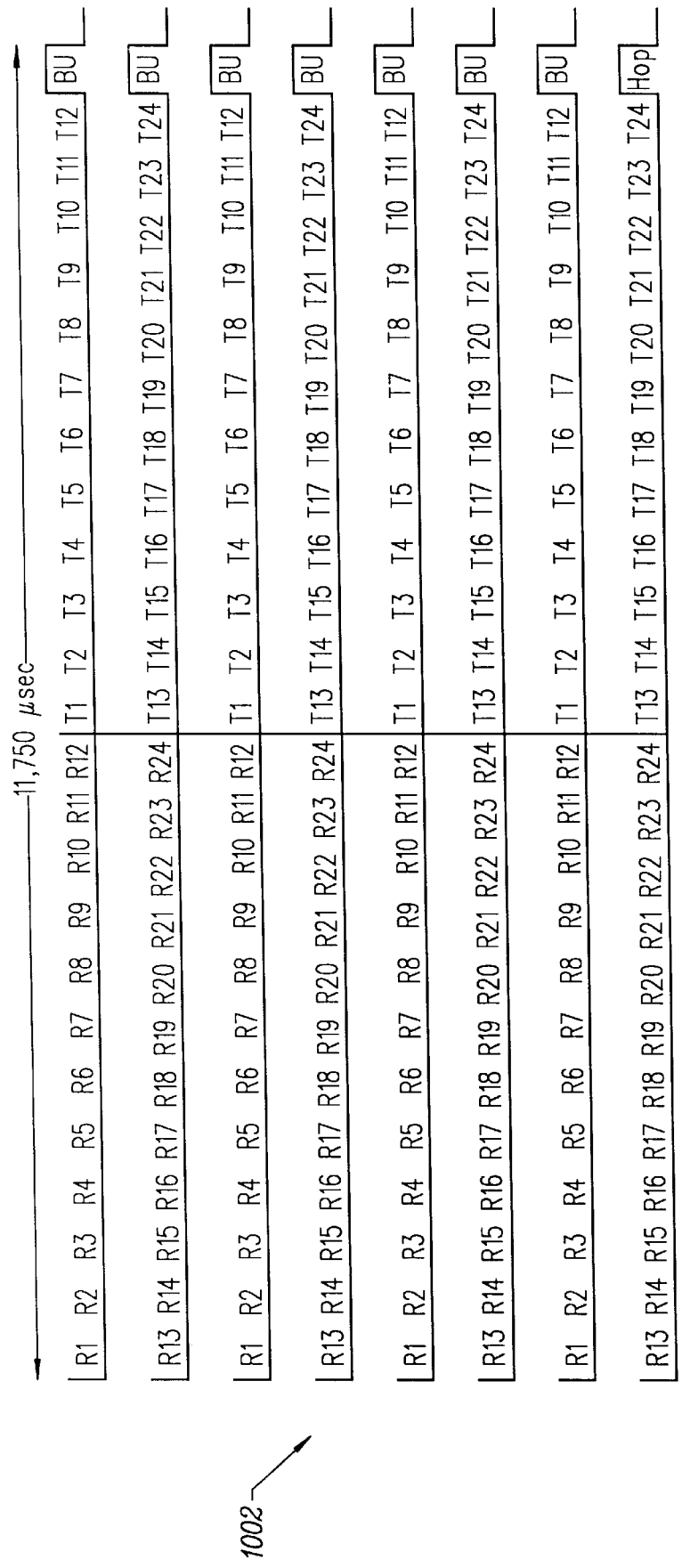

FIG. 10 illustrates a frame 1002 in which all data is transmitted by the terminal units 104 at compression level 1 . As can be seen, the packet time slots for transmission by the terminal units 104 are numbered R1, . . . , R24, with each 12 numbered time slots occurring in alternate sub-frames. That is, packet time slots R1–R12 occur in the first, third, fifth and seventh sub-frame, whereas packet time slots R13–R24 occur in the second, fourth, sixth and eighth sub-frame in each frame. The base unit transmit time slots are numbered in the same manner. Thus each terminal unit 104, for example the one which is allocated time slot R3, now transmits its voice data in only four transmit time slots per frame 1002. At 47 bytes per time slot, and 94 milliseconds per frame, this yields a requirement that the terminal unit 104 compress its voice data into 16 kb/s or less.

Returning to FIG. 7A, after the base unit switches the active terminal units to compression level 1, the base unit 102 then adds the eleventh and twelfth terminal units to the connection table that it maintains internally in the base unit 102 (step 710). In a step 712, the base unit 102 allocates the eleventh and twelfth time slots to the eleventh and twelfth terminal units, respectively, and in a step 714, the base unit 102 transmits base unit (BU) cells to all active terminal units 104, with a packet slot allocation table indicating which terminal units 104 are assigned to transmit during which of the 24 packet time slots. As mentioned, the BU cells are transmitted to all active terminal units 104 at the end of each of the first seven sub-frames of each frame.

After the eleventh and twelfth terminal units receive a BU cell which allocates packet time slots to them, the eleventh and twelfth terminal units begin their conversation (step 716).

In a step 718, it is assumed that over time, ten more terminal units become active, with the base unit allocating packet time slots 13–22. In a step 720, a 23rd terminal unit requests, via a connection control cell transmitted on the 23rd time slot R23, connection to a 24th terminal unit. In step 722, the base unit checks the availability of the 24th terminal unit, and determines that it is available. In step 724, since making the connection would use up all available transmit packet time slots, the base unit then switches all of the active terminal units to compression level 2 (8 kb/s), in the manner previously described with respect to step 708. Then, in step 726, the base unit 102 adds the 23rd and 24th terminal units to its internal connection table, allocates the 23rd and 24th time slots to the 23rd and 24th terminal units respectively (728), and transmits a new BU cell including the new packet time slot allocation table (step 730). In step 732, the 23rd and 24th terminal units begin their conversation.

Figure 12:
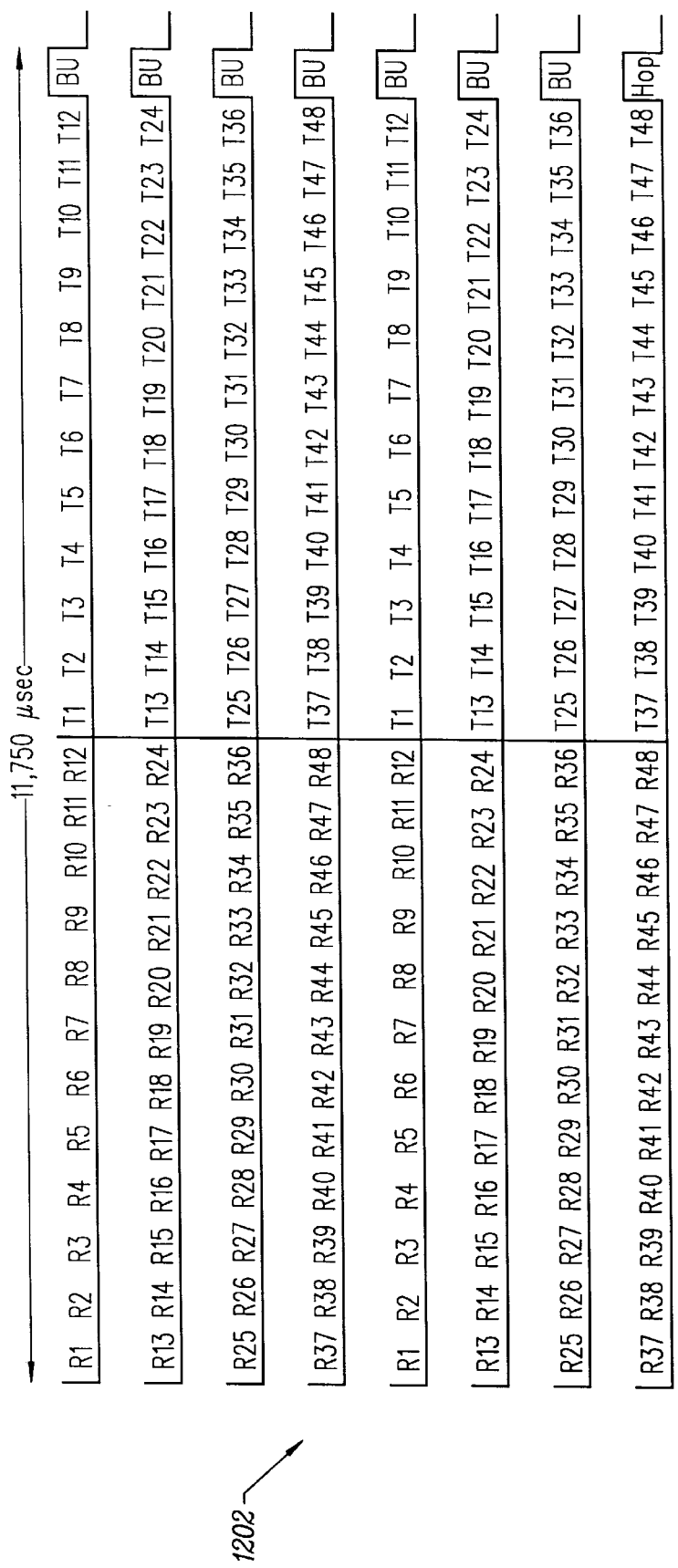

FIG. 12 illustrates a frame 1202 in which up to 48 terminal units can be active using compression level 2. The terminal unit transmit time slots are numbered R1 through R48, with R1–R12 occurring in the first and fifth sub-frames; time slots R13–R24 occurring in the second and sixth sub-frames; time slots R25–R36 occurring in the third and seventh sub-frames; and time slots R37–R48 occurring in the fourth and eighth sub-frames of each frame. Each terminal unit 104 therefore is allocated two time slots per frame to transmit its voice data. At two packet time slots per frame, and 47 bytes of voice data per packet, and 94 milliseconds per frame, each terminal unit must compress its voice data to 8 kb/s or less. The terminal units 104 accomplish this by using the frequency domain compression and expansion facilities 406 and 426 (FIG. 4).

Returning to FIG. 7B, in a step 734, 22 more terminal units become active over time with the base unit 102 allocating time slots 25–46. In a step 736, a 47th terminal requests, via the 47th time slot, connection to a 48th terminal unit 104. The base unit 102 checks the availability of the 48th terminal unit in step 738, determines that it is available, and in step 740, switches all active terminal units 104 to compression level 3 (4 kb/s). Compression level 3 is accomplished using the vocoder compression and decompression facilities 408 and 428 (FIG. 4).

Figure 13:
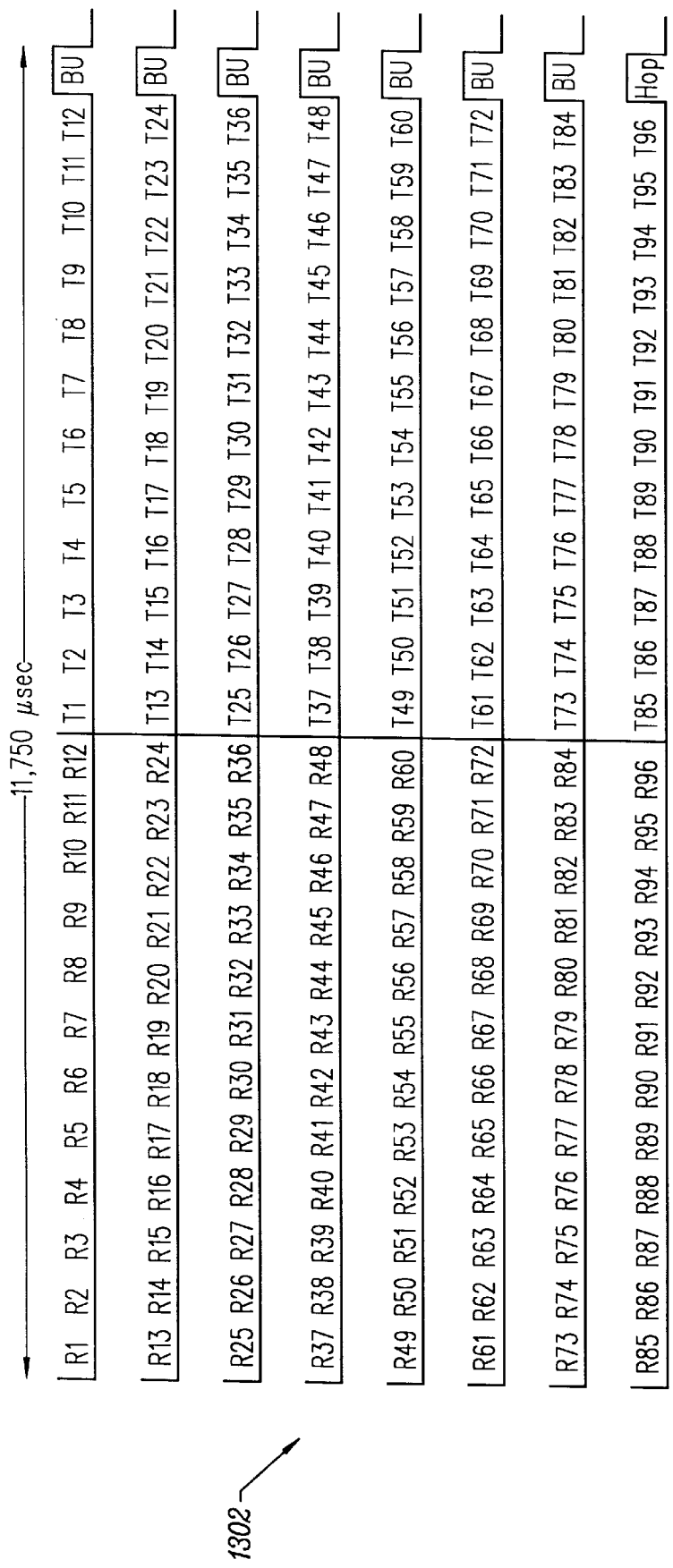

FIG. 13 illustrates the time slot allocation in a frame 1302 when 48–96 terminal units 104 are active. The packet time slots for transmission by terminal units 104 are numbered R1–R96, and each terminal unit 104 must fit its voice information into one packet time slot per frame 1302. At one packet time slot per frame, 47 bytes per packet and 94 milliseconds per frame, the allocation of FIG. 13 allows only 4 kb/s or less for each of the terminal units 104 to transmit its voice information.

Returning to FIG. 7C, in step 742, the base unit proceeds to add the 47th and 48th terminal units to its internal connection table, and in step 744, allocates the 47th and 48th time slots to the 47th and 48th terminal units, respectively. In a step 746, the base unit 102 transmits a BU cell including the new packet slot allocation table, and in step 748, the 47th and 48th terminal units begin their conversation at compression level 3. In step 750, up to 48 more terminal units become active, with the base unit allocating all 96 time slots.

FIG. 11 is a diagram of one of the base unit (BU) cells 1102. The cell has only 30 bytes, but it otherwise still generally complies with the ATM cell format. Bytes 0–5 contain the header fields GFC, VPI, VCI, PTI, CLP, HEC, CSI, SN and SNP. The address field VPI is set to all zeros, and the address field VCI is set to all ones, to indicate a destination for this packet as "all terminal units". Byte 6 indicates the compression level, the number of different BU cells to expect in a frame, and the number of BU cells which will follow in the current frame, all as described in more detail hereinafter. Bytes 7 and 8 indicate the frequency hopping sequence, and bytes 9–25 contain packet slot allocation information as hereinafter described. The last four bytes of the packet contain a CRC-32 error correcting code which, in combination with repetition of the BU packet, provides error detection and correction capability.

The packet slot allocation table in bytes 9–25 of the BU cell indicates which terminal units are assigned to transmit during which transmit packet slots in a frame. In the simple case, with 12 or fewer terminal units active, each byte of the slot allocation table corresponds to one of the 12 transmit packet slots in a given sub-frame 804. The contents of the byte indicates the address of the terminal unit that is assigned to transmit during that transmit packet slot. For example, if Terminal Unit No. 35 is assigned to transmit in packet slots R2 of FIG. 8, then byte 10 of the BU packet of FIG. 11 would contain the number 35. This BU cell is transmitted a total of seven times as shown in FIG. 8, once at the end of each of the subframes 804a–804g. (The corresponding slot at the end of subframe 804h is reserved for frequency hop and settling time.) Any change in the slot allocations, as well as the compression level, takes effect in the following frame 802.

If the number of active terminal units is between 13 and 24 (inclusive), then the system switches to compression level 2 as previously described and illustrated in FIG. 10. The slot allocation table in the BU cell of FIG. 11 is only 17 bytes long, so two different BU cells are needed to contain the full packet allocation table. Two different BU cells are needed even if the number of active terminal units is less than or equal to 17, because the 17 terminal units could be assigned to transmit in any of packet slots 1–24, so long as the system is in compression level 2. The terminal units assigned to transmit in slots 1–17 are designated in the first BU cell, whereas those assigned to transmit in slots 18–24 are designated in the second BU cell. The second BU cell otherwise has the same format as shown in FIG. 11. The two different BU cells are transmitted alternatingly at the end of subframes 804a–g, with the first BU cell being transmitted a total of four times in each frame 802 and the second BU cell being transmitted a total of three times in each frame 802.

If the number of active terminal units is 25–48, then three different BU cells are needed to cover all 48 packet slots. (Three BU cells, at 17 packet slot table entries per BU cell, permits up to 51 packet slot allocations to be designated.) The three different BU cells are each transmitted twice per frame 802, except one is transmitted three times per frame 802. Similarly, if the number of active terminal units is 49–96, then six different BU cells are needed to cover all 96 packet slots (six BU cells collectively contain 6×17=102 slot allocation table entries.) The six different BU cells are each transmitted once per frame 802, except that one of them is transmitted twice.

Table I below sets forth the compression level and the number of different BU cells needed, for different numbers of active terminal units, and indicates which BU cell is transmitted at the end of each subframe. The compression level to use, the number of different BU cells currently in use, and the total number of BU cells to follow the present BU cell in the present frame 802, are indicated in respective fields CL, N.Diff and N.Follow in Byte 6 of each BU cell (FIG. 11).

TABLE I

| No. of Active Terminal Units | Compression Level | No. of Different BU cells | BU Cell Transmitted After Each Subframe | | | | | | |
|---|---|---|---|---|---|---|---|---|---|
| | | | a | b | c | d | e | f | g | j |
| 1–12 | 1 | 1 | 1 | 1 | 1 | 1 | 1 | 1 | 1 | hop |
| 13–24 | 2 | 2 | 1 | 2 | 1 | 2 | 1 | 2 | 1 | hop |
| 25–48 | 3 | 3 | 1 | 2 | 3 | 1 | 2 | 3 | 1 | hop |
| 49–96 | 4 | 6 | 1 | 2 | 3 | 4 | 5 | 6 | 1 | hop |

While the above-described embodiment designates up to 17 packet slot allocations in each different BU cell, it will be appreciated that a different embodiment could designate as few as 14. The base unit can transmit up to seven different BU cells in each frame 802, and a slot allocation table having only 14 entries per different BU cell still contains a total of 98 entries, more than sufficient to specify which terminal unit is assigned to transmit in each of the 96 time slots available at the maximum compression level of the system.

The transceiver/switch 214 in the base unit 102 (FIG. 1) maintains in its memory, under the control of the CPU 202, a connection table indicating which terminal units are connected to each other in a private conversation. FIG. 14 illustrates a sample connection table 1402. It has 96 entries, one for each terminal unit 104 that the system is designed to support. Each entry contains the address of the terminal unit with which the terminal unit of that entry is connected, or null if the terminal unit of that entry is unconnected. In the example of FIG. 14, it can be seen that entry 1, which corresponds to terminal unit 1, contains the address of terminal unit 96. Thus the table indicates that terminal unit 1 is connected to terminal unit 96. Similarly, entry 96 of the table 1402 contains the address of terminal unit 1, thereby redundantly indicating that terminal unit 96 is connected to terminal unit 1. The table 1402 also contains the address of terminal unit 2 in the entries for each of the terminal units 35 and 44; and the entry for terminal unit 2 contains the address of terminal unit 35. This indicates a conference connection among the three terminal units 2, 35 and 44. Such a conference connection is indicated by two entries both containing the address of a third terminal unit, or by three entries pointing to each other in round-robin format.

The transceiver/switch 214 also maintains in its memory the full packet slot allocation table, parts of which are transmitted by the base unit 102 in its BU cells (see FIG. 11 and accompanying discussion). FIG. 15 illustrates a sample packet slot allocation table 1502 in the transceiver/switch 214. As can be seen, the table 1502 contains one entry for each packet slot that is allocable in the maximum compression level. Thus it has entries 1–96 corresponding to packet slots R1–R96. In compression levels 0, 1 and 2, only the first 12, 24 or 48 entries, respectively, of the table 1502 are used. Referring to FIG. 15, it can be seen that the first entry contains the address of terminal unit 2, thereby indicating that packet slot R1 is allocated for transmissions by terminal unit 2. Similarly, the table indicates that packet slots R2, R28, R48 and R96 are allocated for transmissions by terminal units 96, 35, 44 and 1, respectively.

The table 1502 contains a null in the entry in packet slot R27, indicating that no terminal unit is assigned to transmit during that packet slot. Null entries arise frequently during the normal operation of the system of FIG. 1, for example when a conversation terminates and a terminal unit goes inactive. Such null entries can arise anywhere in the table. Thus when the number of active terminal units falls below one of the predefined thresholds, for example 24, the 23 remaining active terminal units are in general using packet slots that are scattered throughout R1–R48. In order to reduce the compression level of the system to take advantage of the reduced utilization, the base unit 102 first rearranges the packet slot allocation 1502 to pack all the remaining active terminal units into packet slots R1–R24. The base unit 102 transmits the revised packet slot allocation table 1502 (with the revised compression level instruction) in the BU cells of one frame 802, and the revised information takes effect in the immediately subsequent frame 802.

It can be seen that the system of FIG. 1 can handle up to 96 terminal units all active concurrently. As used herein, "concurrently" does not require exact simultaneous activity, as can be seen from the description herein. The system shifts into greater compression levels as each of three thresholds are reached. In particular, for any number of active terminal units between one and 11, inclusive, the system uses compression level 0. For any number of active terminal units between 12 and 23, inclusive, the system uses compression level 1. For any number of active terminal units between 24 and 47, inclusive, the system uses compression level 2. For any number of active terminal units above 47, the system uses compression level 3. Whereas the system of FIG. 1 shifts dynamically among different compression levels in four steps, (and hence four different divisions of the total capacity available for transmissions by terminal units), another embodiment could shift among compression levels in a smaller or larger number of different steps. In an extreme embodiment of the invention, the system could shift among compression levels in 96 steps; that is, regardless of the number of active terminal units at any given time, all of the capacity available for transmissions by terminal units is assigned for transmissions by one or another of the terminal units which are active at that time. Also, there is no requirement that a terminal unit in a given embodiment always utilize all of the capacity assigned to it.

It will also be appreciated that whereas the flow chart of FIGS. 7A–7C illustrate the operation of the system with a monotonically increasing number of active terminal units, the number of active terminal units could also decrease at various times. As the number of active terminal units decreases across one of the above thresholds, the system of FIG. 1 switches to a lower level of compression, thereby improving voice transmission quality. That is, for example, as the number of active terminal units decreases from a number greater than 47 to a number which is between 24 and 47 inclusive, the system of FIG. 1 switches from compression level 3 to compression level 2, and so on.

Thus the system of FIG. 1 allows up to 96 terminal units 104 (that is, up to 48 private, full-duplex, two-party conversations) to be active simultaneously, sharing a single time-multiplexed communication medium. This exceptional usage is achieved at the expense of the reduced voice communication quality afforded by compression level 3. A system that used only compression level 3 likely would not have much success in many markets because of the limited quality of voice communication. But since the system of FIG. 1 switches dynamically into compression level 3 only during periods of peak usage, the system will most often be used at lower compression levels with improved quality voice transmission. The dynamic compression level switching capability of the system of FIG. 1 therefore achieves the best of two conventionally achievable kinds of systems. At one extreme is a conventional system which provides very high quality voice communication but permits only a limited number of concurrent conversations to occur. At the other extreme is a system which permits a very large number of concurrent conversations to share the communications medium, but the quality of voice transmission is low. The system of FIG. 1 allows just as many concurrent conversations to occur as in the latter extreme, but through dynamic switching of compression techniques, allows conversations to take place with much higher quality voice transmission at all times except at times of very heavy usage.

The system of FIG. 1 is capable of many variations. As one example, in the embodiment described above, all active terminal units were switched at the same time to a higher or lower compression level when the number of active terminal units crossed a threshold. In another embodiment, terminal unit compression level is controlled on a per-conversation basis, or even on a per-terminal unit basis. For example, such an embodiment allows one conversation or terminal unit to operate at compression level 1, while another concurrent conversation or active terminal unit operates at compression level 2. In such an embodiment, individual terminal units and/or conversations can be assigned a priority such that as new terminal units become active, high-priority active terminal units are the last to be switched to a greater compression level; and vice versa.

As another example, many compression algorithms operate in dependence upon a control parameter which allows compression to be traded off against quality. That is, as the parameter is varied from one end of its range to the other end of its range, compression increases at the expense of quality. As used herein, each setting for such a parameter would result in a "different" compression technique. In the embodiment described herein, especially as illustrated in FIG. 4, four compression levels are provided, each implemented with a substantially different compression algorithm (ADPCM; APC; frequency domain compression and vocoder compression). In another embodiment, a single parameter-dependent algorithm is used for all compression levels, and each "different compression technique" is selected merely by providing a different value for the parameter. Such an embodiment also permits a greater number of available compression levels.

As yet another example, the embodiment of FIG. 1 allows a dynamic trade-off between the number of concurrently active users on the one hand, and the compression level on the-other hand. The trade-off is accomplished by dynamically varying the amount of bit transmission time which is allocated to each terminal unit per unit time. By using a more lossy voice data compression technique, each terminal unit is able to transmit the same information, albeit with reduced transmission quality within the fewer number of bit transmission times per unit time. The system could also be used for transmitting other forms of information, such as data, images or movies. Numerous different compression algorithms exist for these types of information, allowing trade-offs between the number of bit times allocated to each terminal unit per unit time, and the quality of the transmission.

However, the different compression techniques do not need to have varying lossiness in order for the concepts of the invention to apply. Rather, the invention applies also when techniques achieving greater compression levels do so at the expense of other undesirable characteristics, such as transmission lag time. For example, in an embodiment, one compression facility compresses the input data to compression level 1 with very little loss of quality and with the introduction of very little lag time. Another compression facility compresses the input data to compression level 2 without any further loss of quality; but significantly increased processing time is required, so a greater lag time is introduced. Because the invention does not depend on the use of techniques having varying degrees of lossiness, a system such as that of FIG. 1 can be used with input data that requires lossless transmission such as computer software or textual data.

The invention is not limited in application to time multiplexed communications media. The invention can be used also where other kinds of sharing techniques are used, such as bandwidth allocation. For example, in an embodiment, a system is permitted to utilize a total overall bandwidth. The system divides the overall bandwidth into, for example, 96 individual frequency bands. These bands are used in a time-alternating manner for transmissions alternately by (1) all terminal units, and (2) the base unit. When the terminal units are transmitting, the 96 frequency bands are allocable among up to 96 terminal units. Each active terminal unit transmits during the time allocated for transmissions by terminal units, but only within the frequency band(s) allocated to each particular active terminal unit. The base unit repeats the transmissions back to the terminal units for receipt by each destination terminal unit, during the time allocated for transmissions by the base unit, using as many of the 96 frequency bands as are needed. Transmissions may be analog or digital in different embodiments, and the base unit dynamically allocates 1, 2, 4 or 8 of the frequency bands 1–96 to individual active terminal units, in dependence upon the total number of terminal units that are active at any given time. Alternatively, the number of frequency bands allocated to each terminal unit remains constant, but the bandwidth of such bands varies dynamically among 1, 2, 4 or 8 times a predefined minimum bandwidth.

Other embodiments can use other techniques for dividing up the transmission capacity of the shared medium, or can use combinations of two or more techniques. In general, the medium has a total "capacity", whether that be measured in numbers of time slots or packet slots, or frequency bands, or some other unit. Of that total capacity, a portion represents the total capacity available for allocation for transmissions by individual terminal units. When fewer numbers of terminal units are active, each active terminal unit is allocated a greater portion of the total capacity available for allocation for transmissions by individual terminal units. When greater numbers of terminal units are active, each active terminal unit is allocated a smaller portion of the total capacity available for allocation for transmissions by individual terminal units. Each of the terminal units compresses (or discards) information from its input signal sufficiently to fit within the transmission capacity allocated to the terminal unit. That is, each of the terminal units converts its input signal to an output signal that has a "data volume per unit time" which is small enough to fit within the transmission capacity allocated to the terminal unit.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

I claim:

1. A method for operating a system having a plurality of terminal units each having an active and an inactive state with respect to a time multiplexed communications medium, said system further including a control unit, comprising the steps of:

allocating, when a number $N_A$ of said terminal units are active, an amount of time $T_{A,i}$ per unit time for transmissions via said communications medium by each respective i'th one of said active terminal units, said control unit transmitting, via said communications medium, indications of said amounts of time $T_{A,i}$ for each of said active units;

said control unit receiving, via said communications medium, requests from at least one of said terminal units for at least k of said inactive terminal units to become active;

said control unit transmitting an approval of said requests via said communications medium; and allocating, when a number $N_B$ of said terminal units are active, $N_B=N_A+k$, an amount of time $T_{B,i}$ per unit time for transmissions via said communications medium by each respective i'th one of said active terminal units, said control unit transmitting, via said communications medium, indications of said amounts of time $T_{B,i}$ for each of said active units, wherein $T_{B,i} < T_{A,i}$ for at least a first one of said active terminal units.

2. A method for operating a system having a plurality of terminal units each having an active and an inactive state with respect to a time multiplexed communications medium, said system further having a control unit, comprising the steps of:

allocating, when a number $N_A$ of said terminal units are active, an amount of time $T_{A,i}$ per unit time for transmissions via said communications medium by each respective i'th one of said active terminal units;

allocating an amount of time $T_{A,b}$ per unit time for transmissions by said control unit via said communications medium when $N_A$ of said terminal units are active;

allocating, when a number $N_B$ of said terminal units are active, $N_B > N_A$, an amount of time $T_{B,i}$ per unit time for transmissions via said communications medium by each respective i'th one of said active terminal units, and allocating an amount of time $T_{B,b}$ per unit time for transmissions by said control unit via said communications medium when $N_B$ of said terminal units are active, wherein $T_{B,i} < T_{A,i}$ for at least a first one of said active terminal units, and wherein $T_{A,b} = T_{B,b}$.

3. A method according to claim 1, wherein said communications medium comprises a wireless communications medium.

4. A method according to claim 1, wherein said first active terminal unit transmits isochronous data both when allocated $T_{A,1}$ per unit time and when allocated $T_{B,1}$ per unit time.

5. A method according to claim 1, further comprising a step of allocating, when a number $N_C$ of said terminal units are active, an amount of time $T_{C,i}$ per unit time for transmission via said communications medium by each respective i'th one of said active terminal units, $N_C > N_B$, wherein $T_{C,i} < T_{B,i}$ for at least one of said active terminal units.

6. A method according to claim 1, wherein said communications medium operates in temporally sequential frames during a subject time period, wherein said step of allocating an amount of time $T_{A,i}$ comprises a step of allocating a number $S_{A,i}$ of time slots in each of said frames for transmission via said communications medium by each respective i'th one of said active terminal units, and wherein said step of allocating an amount of time $T_{B,i}$ comprises a step of allocating a number $S_{B,i}$ of time slots in each of said frames for transmission via said communications medium by each respective i'th one of said active terminal units.

7. A method according to claim 6, wherein all of said time slots have equal duration.

8. A method according to claim 6, wherein each of said frames is divided into a plurality of sub-frames, and wherein said step of allocating $S_{A,i}$ time slots in each of said frames comprises a step of allocating one time slot per sub-frame for a second one of said active terminal units.

9. A method according to claim 8, wherein said step of allocating $S_{B,i}$ time slots in each of said frames comprises a step of allocating one time slot per two sub-frames for said second active terminal unit.

10. A method for operating a system having a plurality of terminal units each having an active and an inactive state with respect to a time multiplexed communications medium operating in temporally sequential equal duration frames during a subject time period, comprising the steps of:

allocating, when a number $N_A$ of said terminal units are active, an amount of time $T_{A,i}$ per unit time for transmission via said communications medium by each respective i'th one of said active terminal units; and allocating, when a number $N_B$ of said terminal units are active, $N_B > N_A$, an amount of time $T_{B,i}$ per unit time for transmissions via said communications medium by each respective i'th one of said active terminal units, wherein $T_{B,i} < T_{A,i}$ for at least a first one of said terminal units, wherein said step of allocating an amount of time $T_{A,i}$ comprises a step of allocating a number $S_{A,i}$ of time slots in each of said frames for transmission via said communications medium by each respective i'th one of said active terminal units, and wherein said step of allocating an amount of time $T_{B,i}$ comprises a step of allocating a number $S_{B,i}$ of time slots in each of said frames for transmission via said communications medium by each respective i'th one of said active terminal units, wherein each of said time slots has equal duration, said first active terminal unit transmitting via said communications medium at a rate of B bits per time slot, $S_{A,1}$ time slots per frame being allocated to said first active terminal unit when $N_A$ terminal units are active, and $S_{B,1}$ time slots per frame being allocated to said first terminal unit when $N_B$ terminal units are active, further comprising the steps of said first active terminal unit:

producing first output data at a rate $R_{A,1}$ bits per frame in response to first isochronous input data, while $S_{A,1}$ time slots per frame are allocated to said first terminal unit, $B^*S_{B,1} < R_{A,1} \leq B^*S_{A,1}$;

compressing said first isochronous input data to produce said first output data at a rate $R_{B,1}$ bits per frame while $S_{B,1}$ time slots per frame are allocated to said first active terminal unit $R_{B,1} \leq B^*S_{B,1}$; and transmitting said first output data via said communications medium during time slots allocated to said first active terminal unit.

11. A method according to claim 10, wherein $R_{A,1}=B*S_{A,1}$ and $R_{B,1}=B*S_{B,1}$.

12. A method according to claim 10, wherein said step of producing first output data at a rate $R_{A,1}$ bits per frame comprises a step of compressing said first isochronous input data to produce said first output data at said rate $R_{A,1}$.

13. A method according to claim 12, wherein said step of compressing said first isochronous input data to produce said first output data at a rate $R_{A,1}$ comprises a step of compressing said first isochronous input data by a first data compression technique, and wherein said step of compressing said first isochronous input data to produce said first output data at a rate $R_{B,1}$ comprises a step of compressing said first isochronous input data by a second data compression technique different from said first data compression technique.

14. A method according to claim 13, wherein said second data compression technique is more lossy than said first data compression technique.

15. A method according to claim 10, further comprising the steps of:

allocating $S_{C,1}$ time slots in each of said frames for transmission via said communications medium by said first active terminal unit when a number $N_C$ of said terminal units are active, $N_C>N_B$ and $S_{C,1}<S_{B,1}$; and said first terminal unit compressing said first isochronous input data to produce said first output data at a rate $R_{C,1}$ bits per frame while $S_{C,1}$ time slots per frame are allocated to said first active terminal unit, $R_{C,1} \leq B*S_{C,1}<R_{B,1}$, wherein said step of compressing said first isochronous input data to produce said first output data at a rate $R_{B,1}$ comprises a step of compressing said first isochronous input data by a second data compression technique, and wherein said step of compressing said first isochronous input data to produce said first output data at a rate $R_{C,1}$ comprises a step of compressing said first isochronous input data by a third data compression technique which is different from said second data compression technique.

16. A method according to claim 15, wherein both said second and third data compression techniques are lossy.

17. A method according to claim 15, wherein both said second and third data compression techniques are lossy, said third data compression technique being more lossy than said second data compression technique.

18. A method according to claim 6, further comprising the step of a second one of said active terminal units transmitting via said communications medium during one of the time slots allocated to said second active terminal unit.

19. A method according to claim 6, wherein said system further includes a control unit, further comprising the step of allocating an outbound portion in each of said frames for transmission via said communications medium by said control unit.

20. A method for operating a system having a plurality of terminal units each having an active and an inactive state with respect to a time multiplexed communications medium operating in temporally sequential frames during a subject time period, comprising the steps of:

allocating, when a number $N_A$ of said terminal units are active, an amount of time $T_{A,i}$ per unit time for transmissions via said communications medium by each respective i'th one of said active terminal units; and allocating, when a number $N_B$ of said terminal units are active, $N_B>N_A$, an amount of time $T_{B,i}$ per unit time for transmissions via said communications medium by each respective i'th one of said active terminal units, wherein $T_{B,i}<T_{A,i}$ for at least a first one of said active terminal units, wherein said step of allocating an amount of time $T_{A,i}$ comprises a step of allocating a number $S_{A,i}$ of time slots in each of said frames for transmission via said communications medium by each respective i'th one of said active terminal units, wherein said step of allocating an amount of time $T_{B,i}$ comprises a step of allocating a number $S_{B,i}$ of time slots in each of said frames for transmission via said communications medium by each respective i'th one of said active terminal units, and wherein said step of allocating $S_{B,i}$ time slots in each of said frames comprises a step of allocating one time slot per two sub-frames for said second active terminal unit, further comprising the steps of:

establishing a logical connection among a first set of at least two of the terminal units in said plurality of terminal units, said terminal units in said first set being active terminal units at least while said logical connection exists;

said control unit re-transmitting to a first one of the terminal units in said first set via said communications medium, first data received by said control unit during time slots allocated to a second one of the terminal units in said first set; and said control unit re-transmitting to said second terminal unit in said first set via said communications medium, second data received by said control unit during time slots allocated to said first one of the terminal units in said first set.

21. A method according to claim 20, wherein said step of establishing a logical connection comprises the step of said control unit updating a connection table to indicate the terminal units which are subject to said logical connection, in response to a request via said communications medium from at least one of the terminal units in said first set to establish a logical connection.

22. A method according to claim 21, wherein said step of establishing a logical connection further comprises the step of broadcasting said connection table, as updated, via said communications medium.

23. A method according to claim 20, wherein each of said active terminal units has a respective address, wherein said step of re-transmitting to a first one of said terminal units in said first set includes a step of transmitting said first data via said communications medium during outbound portions of said frames, with an identification of said first one of said terminal units in said first set, and wherein said step of re-transmitting to a second one of the terminal units in said first set includes a step of transmitting said second data via said communications medium during outbound portions of said frames, with an identification of said second one of the terminal units in said first set.

24. A method according to claim 20, further comprising the steps of:

establishing a second logical connection among a second set of at least two of the terminal units in said plurality of terminal units, said terminal units in said second set being active terminal units at least while said second logical connection exists, said second set being distinct from said first set;

said control unit re-transmitting to a first one of the terminal units in said second set via said communications medium, third data received by said control unit during time slots allocated to a second one of the terminal units in said second set;

said control unit re-transmitting to said second one of the terminal units in said second set via said communications medium, fourth data received by said control unit during time slots allocated to said first one of the terminal units in said second set;

each of the terminal units in said second set receiving and discarding all of said first and second data re-transmitted by said control unit to terminal units in said first set; and each of the terminal units in said first set receiving and discarding all of said third and fourth data re-transmitted by said control unit to terminal units in said second set.

25. A method according to claim 1, wherein one of said terminal units is a repeater.

26. A communications system for conducting communications via a wireless communications medium operating with temporally sequential frames, comprising:

a plurality of terminal units, each having an active and an inactive state and each active one of said terminal units receiving respective input data at a respective input data rate; and a base unit which allocates for transmissions by each i'th one of said active terminal units a respective number $S_{A,i}$ of incoming time slots in each of said frames when the number of said terminal units which are active is between 1 and a first threshold $N_A$, inclusive, and a number $S_{B,i}$ of incoming time slots in each of said frames when the number of said terminal units which are active is between $N_A+1$ and a number $N_B$, inclusive, $N_B > N_A$, all of said incoming time slots having equal duration and $S_{B,i}$ being different from $S_{A,i}$ for at least one of said active terminal units, each given active one of said terminal units including:

a data compression mechanism which, when $S_{B,i}$ incoming time slots per frame are allocated to the given terminal unit, compresses the input data received by the given terminal unit sufficiently to fit within $S_{B,i}$ time slots per frame, and which, when $S_{A,i}$ incoming time slots per frame are allocated to the given terminal unit, compresses the input data received by the given terminal unit sufficiently to fit within $S_{A,i}$ time slots per frame but insufficiently to fit within $S_{B,i}$ per frame, each of said data compression mechanisms having a respective data output; and a transmitter coupled to receive the data output of the data compression mechanism in the given terminal unit and to transmit such data output via said communications medium during the incoming time slots allocated to the given terminal unit.

27. A system according to claim 26, further for conducting conversations among members of respective distinct sets of said terminal units, wherein each of said frames further has allocated therein at least one outgoing time segment for transmissions by said base unit, wherein said base unit comprises retransmission apparatus which receives the data transmitted by each of said active terminal units and retransmits it via said communications medium in packets during the outgoing time segments, each of said packets being directed to at least a respective particular terminal unit and containing data that is dependent upon the data received by said retransmission apparatus during incoming time slots which were allocated to members of the set of terminal units that includes the particular terminal unit.

28. A system according to claim 27, wherein each frame includes a number of outgoing time slots in said outgoing segments, wherein the data re-transmitted by said retransmission apparatus and directed to each j'th one of said active terminal units is re-transmitted within $S_j$ outgoing time slots per frame, $S_j$ being the number of incoming time slots then allocated for transmissions by the j'th terminal unit, and wherein each given active one of at least a subset of said terminal units further includes:

a receiver coupled to receive the packets transmitted by said base unit, said receiver having an output and providing thereon only data from received packets which are addressed to at least the given terminal unit; and a data decompression mechanism coupled to the output of the receiver and which decompresses the data provided by said receiver to the input data rate of the given terminal unit.

29. A system according to claim 28, wherein the data contained in each subject one of said packets is dependent only upon data received by said terminal unit during incoming time slots which are allocated to members of the set of terminal units that includes the terminal unit to which the subject packet is directed.

30. A system according to claim 29, wherein said data decompression mechanism has an output, and wherein each certain terminal unit in one of said sets further includes:

a voice input device providing the input data of the certain terminal unit; and an audio output device coupled to output the output of the data decompression mechanism of said certain terminal unit.

31. A control unit for use with a plurality of terminal units each having an active and an inactive state with respect to a shared communications medium having a total capacity C for transmissions by said terminal units, said communications medium operating in temporally sequential frames during a subject time period, comprising:

means for allocating, when a number $N_A$ of said terminal units are active, a portion $C_{A,i}$ of said total capacity C for transmissions via said communications medium by each respective i'th one of said active terminal units; and means for allocating, when a number $N_B$ of said terminal units are active, $N_B > N_A$, a portion $C_{B,i}$ of said total capacity C for transmissions via said communications medium by each respective i'th one of said active terminal units, wherein $C_{B,i} < C_{A,i}$ for at least a first one of said active terminal units, wherein said means for allocating a portion $C_{A,i}$ of said total capacity C comprises means for allocating a number $S_{A,i}$ of time slots in each of said frames for transmission via said communications medium by each respective i'th one of said active terminal units, wherein said means for allocating a portion $C_{B,i}$ of said total capacity C comprises means for allocating a number $S_{B,i}$ of time slots in each of said frames for transmission via said communications medium by each respective i'th one of said active terminal units, wherein each of said frames is divided into a plurality of sub-frames, and wherein said means for allocating $S_{A,i}$ time slots in each of said frames comprises means for allocating one time slot per sub-frame for a second one of said active terminal units, and wherein said step of allocating $S_{B,i}$ time slots in each of said frames comprises a step of allocating one time slot per two sub-frames for said second active terminal unit.

32. A control unit according to claim 31, wherein each of said means for allocating comprises the means in said control unit for transmitting, via said communications medium, an indication of the portion of said total capacity C allocated for transmissions via said communications medium by each of said active terminal units.

33. A control unit according to claim 31, wherein said total capacity C is measured in time, C defining a total amount of time T which is allocable for transmissions by said terminal units per unit time, wherein each said portion $C_{A,i}$ of said total capacity C defines a respective amount of time $T_{A,i}$ of said total amount of time T, and wherein each said portion $C_{B,i}$ of said total capacity C defines a respective amount of time $T_{B,i}$ of said total amount of time T, $T_{B,i}$ being less than $T_{A,i}$ for at least said first active terminal unit.

34. A control unit according to claim 33, further comprising means for allocating, when a number $N_C$ of said terminal units are active, an amount of time $T_{C,i}$ per unit time for transmission via said communications medium by each respective i'th one of said active terminal units, $N_C > N_B$, wherein $T_{C,i} < T_{B,i}$ for at least one of said active terminal units.

35. A control unit for use with a plurality of terminal units each having an active and an inactive state with respect to a shared communications medium having a total capacity C for transmissions by said terminal units, said communications medium operating in temporally sequential frames during a subject time period, comprising:

means for allocating, when a number $N_A$ of said terminal units are active, a portion $C_{A,i}$ of said total capacity C for transmissions via said communications medium by each respective i'th one of said active terminal units; and means for allocating, when a number $N_B$ of said terminal units are active, $N_B > N_A$, a portion $C_{B,i}$ of said total capacity C for transmissions via said communications medium by each respective i'th one of said active terminal units, wherein $C_{B,i} < C_{A,i}$ for at least a first one of said active terminal units, wherein said means for allocating a portion $C_{A,i}$ of said total capacity C comprises means for allocating a number $S_{A,i}$ of time slots in each of said frames for transmission via said communications medium by each respective i'th one of said active terminal units, wherein said means for allocating a portion $C_{B,i}$ of said total capacity C comprises means for allocating a number $S_{B,i}$ of time slots in each of said frames for transmission via said communications medium by each respective i'th one of said active terminal units, wherein an outbound portion in each of said frames is allocated for transmission via said communications medium by said control unit, wherein a logical connection exists among a first set of at least two of the terminal units in said plurality of terminal units, said terminal units in said first set being active terminal units at least while said logical connection exists, said control unit further comprising:

means for re-transmitting to a first one of the terminal units in said first set via said communications medium, first data received by said control unit during time slots allocated to a second one of the terminal units in said first set; and means for re-transmitting to said second terminal unit in said first set via said communications medium, second data received by said control unit during time slots allocated to said first one of the terminal units in said first set.

36. A control unit according to claim 35, further comprising a memory having stored therein a connection table including an indication of the terminal units which are subject to said logical connection.

37. A control unit according to claim 36, further comprising means for establishing said indication in said connection table, in response to a request via said communications medium from at least one of the terminal units in said first set to establish a logical connection.

38. A control unit according to claim 35, wherein each of said active terminal units has a respective address, wherein said means for re-transmitting to a first one of said terminal units in said first set includes means for transmitting said first data via said communications medium during outbound portions of said frames, in conjunction with an identification of said first one of said terminal units in said first set, and wherein said means for re-transmitting to a second one of the terminal units in said first set includes means for transmitting said second data via said communications medium during outbound portions of said frames, in conjunction with an identification of said second one of the terminal units in said first set.

* * * * *